United States Patent
Wallace et al.

(10) Patent No.: US 8,990,006 B1
(45) Date of Patent: Mar. 24, 2015

(54) MONITORING AND TRACKING PERSONAL FITNESS INFORMATION

(75) Inventors: Kevin G. Wallace, San Francisco, CA (US); Steven R. Kusmer, San Francisco, CA (US)

(73) Assignee: Abvio Inc., San Francisco, CA (US)

( * ) Notice: Subject to any disclaimer, the term of this patent is extended or adjusted under 35 U.S.C. 154(b) by 346 days.

(21) Appl. No.: 13/217,048

(22) Filed: Aug. 24, 2011

Related U.S. Application Data

(60) Provisional application No. 61/376,573, filed on Aug. 24, 2010.

(51) Int. Cl.
  G01C 21/00    (2006.01)
  G01C 22/00    (2006.01)

(52) U.S. Cl.
  CPC .................................... *G01C 22/006* (2013.01)
  USPC ...................................................... 701/408

(58) Field of Classification Search
  CPC ........... A63B 2220/00; A63B 2220/10; A63B 2220/12; A63B 2220/13; A63B 2220/14; A63B 2220/16; A63B 2220/17; A63B 2220/20; A63B 2220/22; A63B 2220/24; A63B 2220/36
  USPC ......... 701/445–447, 494, 495, 500, 501, 505, 701/507, 518
  See application file for complete search history.

(56) References Cited

U.S. PATENT DOCUMENTS

| | | | |
|---|---|---|---|
| 2004/0220728 A1* | 11/2004 | Cayford | 701/209 |
| 2006/0119507 A1* | 6/2006 | Cawse | 342/357.13 |
| 2007/0179709 A1* | 8/2007 | Doyle | 701/209 |
| 2007/0208496 A1* | 9/2007 | Downs et al. | 701/117 |
| 2010/0141518 A1* | 6/2010 | Hersey et al. | 342/357.09 |
| 2011/0270135 A1* | 11/2011 | Dooley et al. | 600/595 |
| 2011/0313648 A1* | 12/2011 | Newson et al. | 701/200 |
| 2012/0184829 A1* | 7/2012 | Sekii et al. | 600/323 |

OTHER PUBLICATIONS

MapMyFitness, Map Fitness Training and Track Fitness Workouts, http://www.mapmyfitness.com, retrieved Apr. 6, 2012, 3 pgs.
Mobile Technology Takes the Lead, YouTube Video, http://www.youtube.com/watch?v=4lueeUOsDWI, retrieved Apr. 6, 2012, 3 pgs.
RunKeeper: Running App and Fitness Community, http://www.runkeeper.com, retrieved Apr. 6, 2012, 2 pgs.

* cited by examiner

*Primary Examiner* — John Q Nguyen
*Assistant Examiner* — Jordan S Fei
(74) *Attorney, Agent, or Firm* — Patent Law Works LLP

(57) ABSTRACT

A method and system for tracking an activity is described. A location tracking engine tracks a user's location, determines a direction by identifying a plurality of angles ahead of the current location on the path, and conveys navigation information to the user. A filter module receives a location update from a location tracking engine. The filter module performs at least one test on the location update. The filter module adds the location update to a queue of recently received location updates in response to passing the test. The stop detector module determines that the user is stopped and sets the current status to stopped and sets a time of a stop detection change to the later of the last time that of the stop detection change and a timestamp of the oldest location update in the queue if a previous status is moving.

24 Claims, 15 Drawing Sheets

MONITORING AND TRACKING PERSONAL FITNESS INFORMATION

CROSS-REFERENCE TO RELATED APPLICATIONS

This application claims priority under 35 U.S.C. §119(e) to U.S. Provisional Patent Application No. 61/376,573, filed on Aug. 24, 2010, entitled "Computer Implemented Systems and Methods for Monitoring and Tracking Personal Fitness Information" which is herein incorporated by reference in its entirety.

BACKGROUND OF THE INVENTION

1. Field of the Invention

The specification relates to a system and method for tracking personal fitness information. In particular, the specification relates to enhancing measuring performance and progress for motion-based exercising.

2. Description of the Background Art

A mobile device that includes hardware and software for tracking location information of the user can be configured to record and measure performance and progress during various motion-based exercises. Various motion-based exercises include running, walking, cycling, rowing, etc. Many mobile devices employ a combination of Wi-Fi, cellular, and Global Positioning System (GPS) networks to determine position. When a user carries the mobile device during an exercise workout, the mobile device continually records time, location, distance, elevation and speed of the exercise. Also, data from sensors collect bicycle speed, bicycle cadence, heart rate, and bicycle power may be incorporated. In addition to tracking location, the mobile devices include navigational systems for providing directions based on start and destination points. The systems use a predetermined database of streets or paths. The systems determine direction decisions based on location proximity to waypoints derived from the database. Therefore, the navigational systems require a massive database to provide the directions. Also, the database may not include information to guide a user on an arbitrary path. For example, the user may select a cross-country mountain bike route that does not exist in existing systems.

Additional deficiencies exist. Workout performance results are available to the user both during and after the workout. However, the location information is often inaccurate. For example, location services that employ GPS may also incorporate Wi-Fi and cell towers to determine location are often inaccurate. Because performance and progress measurements of a workout are based in part on location information, the accuracy of the performance measurements is dependent on the accuracy of the location information. In addition to accurate measurements, the user needs appropriate feedback to motivate the user during and after the workout.

SUMMARY OF THE INVENTION

The present invention provides a method and system for tracking an activity. In one embodiment, a fitness monitor module comprises a location tracking engine, a filter module, a stop detector module, a graphical user interface module, a competition module and an audio generator module. The location tracking engine tracks a geographic location of a client device during an activity that is performed by a user. In one embodiment the location tracking engine determines a direction for a user by identifying a plurality of angles ahead of the current location on the path and identifies a most acute angle from the plurality of angles. The filter module detects and filters location updates that are unacceptable. The stop detector module determines stops and stopped time during the activity. The graphical user interface module generates a user interface that receives inputs from a user and/or displays information to the user. The competition module compares a competition workout with a current workout performed by the user. By competing against a previous workout or another user's workout, the user is encouraged to achieve higher levels of performance and fitness. The audio generator module generates audio signals based on progress of the user during the activity.

In one embodiment, a location tracking engine initializes tracking an activity that is performed by a user. A filter module receives a location update from the location tracking engine. The filter module performs at least one test on the location update. The filter module adds the location update to a queue of recently received location updates in response to passing the at least one test. The filter module filters the queue of recently received location updates based on timestamps of the location updates in the queue. The stop detector module determines that the user is stopped and sets the current status to stopped and sets a time of a stop detection change to the later of the last time that the stop detection changed and a timestamp of the oldest location update in the queue if a previous status is moving. The stop detector module determines that the user is moving, adds a cumulative stop time and sets a time of a stop detection change if a previous status is stopped. The stop detector module determines whether the activity is complete. If not, the stop detector module continues to receive location updates. If the activity is complete, the method is finished.

In one embodiment, the specification includes a computer program product comprising a computer useable medium including a computer readable program, wherein the computer readable program when executed on a computer causes the computer to track a workout or an activity that is performed by a user.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION OF THE PREFERRED EMBODIMENTS

Figure 1:
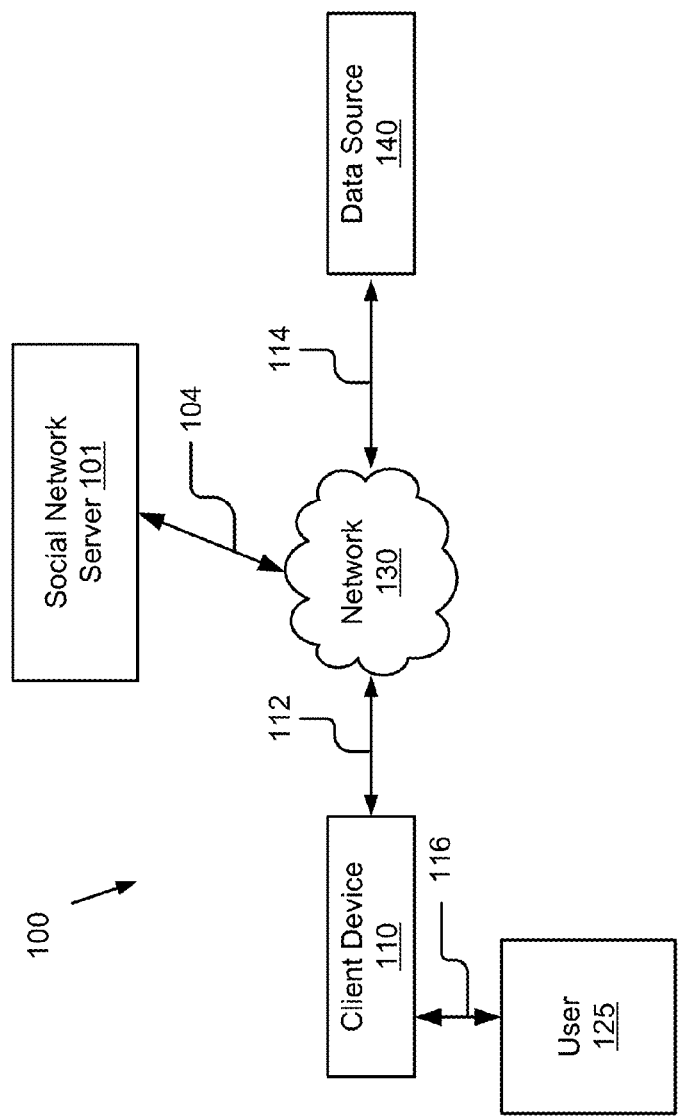
FIG. 1 is a high-level block diagram illustrating one embodiment of a system for tracking personal fitness information.

A system and method for improved monitoring and tracking personal fitness information is described below. In the following description, for purposes of explanation, numerous specific details are set forth in order to provide a thorough understanding of the invention. It will be apparent, however, to one skilled in the art that the embodiments can be practiced without these specific details. In other instances, structures and devices are shown in block diagram form in order to avoid obscuring the invention. For example, the invention is described in one embodiment below with reference to user interfaces and particular hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this invention, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

System Overview

FIG. 1 illustrates a block diagram of a system 100 for tracking personal fitness information according to one embodiment of the invention. In the embodiment, the system 100 includes a client device 110, a data source 140 and a social network server 101. In the illustrated embodiment, these entities are communicatively coupled via a network 130. Although only one client device is illustrated, persons of ordinary skill in the art will recognize that any number of client devices 110 are available to any number of users 125. Furthermore, while only one network 130 is coupled to the client device 110, the data source 140 and the social network server 101, in practice any number of networks 130 can be connected to the entities.

The client device 110 is any portable computing device. For example, the client device 110 is a cell phone (e.g., a smart phone, a feature phone, a dumb phone, etc.), a personal digital assistant (pda), a tablet computer (or tablet PC), a laptop, etc. In one embodiment, the system 100 comprises a combination of different types of client devices 110. For example, a first client device 110 is a smart phone, a second client device is a pda and a plurality of other client devices is any combination of a smart phone, a pda, a laptop and a tablet computer. The client device 110 is coupled to network 130 via signal line 112. The user 125 interacts with the client device 110 via signal line 116.

A data source 140 is a computing device including data processing and communication capabilities. Data source 140 is coupled to network 130 via signal line 114. For purposes of illustration, FIG. 1 illustrates a system 100 including one data source 140; however, in other embodiments, the system 100 includes any number of data sources 140. Data source 140 includes a processor, a location unit and a storage device. However, in other embodiments, a data source 140 may include different and/or additional components. The data source 140 stores workout data for one or more user 125.

In one embodiment, a workout data file for the user 125 is stored on the data source 140. The user 125 or a second user accesses the workout data file by requesting the workout data file from the data source 140 and saving the workout data file to the client device 110. A second user accesses another user's data, for example, for joining in a competition with the first user by requesting the data from the data source. In one embodiment, the user 125 accesses the workout data file by clicking a link that points to the workout data file on the data source 140. In another embodiment, a message sent through a social network includes the link. In yet another embodiment, the message includes the workout data file as an attachment. In one embodiment, the workout data file includes map information of the workout. In another embodiment, the workout data file includes a plurality of location update points that comprises latitude, longitude and time of each point of the workout.

In one embodiment, one type of data source 140 is a cellular tower or a global positioning system for providing the client device 110 with location data.

The social network server 101 is coupled to the network 130 via signal line 104. Although only one social network server 101 is shown, persons of ordinary skill in the art will recognize that multiple servers may be present. A social network is any type of social structure where the users are connected by a common feature, for example, Facebook and Twitter. The common feature includes user-initiated connections such as friendship, family, work, an interest, etc. The common features are provided by one or more social networking systems, such as those included in the system 100, including explicitly-defined relationships and relationships implied by social connections with other online users, where the relationships form a social graph. In some examples, the social graph reflects a mapping of these users and how they are related. In one embodiment, the social network server 101 comprises an email server for transmitting email messages.

The network 130 is a conventional type, wired or wireless, and may have any number of configurations such as a star configuration, token ring configuration or other configurations known to those skilled in the art. Furthermore, the network 130 may comprise a local area network (LAN), a wide area network (WAN) (e.g., the Internet), and/or any other interconnected data path across which multiple devices may communicate. In yet another embodiment, the network 130 may be a peer-to-peer network. The network 130 may also be coupled to or includes portions of a telecommunications network for sending data in a variety of different communication protocols. In yet another embodiment, the network 130 includes Bluetooth communication networks or a cellular communications network for sending and receiving data such as via short messaging service (SMS), multimedia messaging service (MMS), hypertext transfer protocol (HTTP), direct data connection, WAP, email, etc.

Client Device 110

Figure 2:
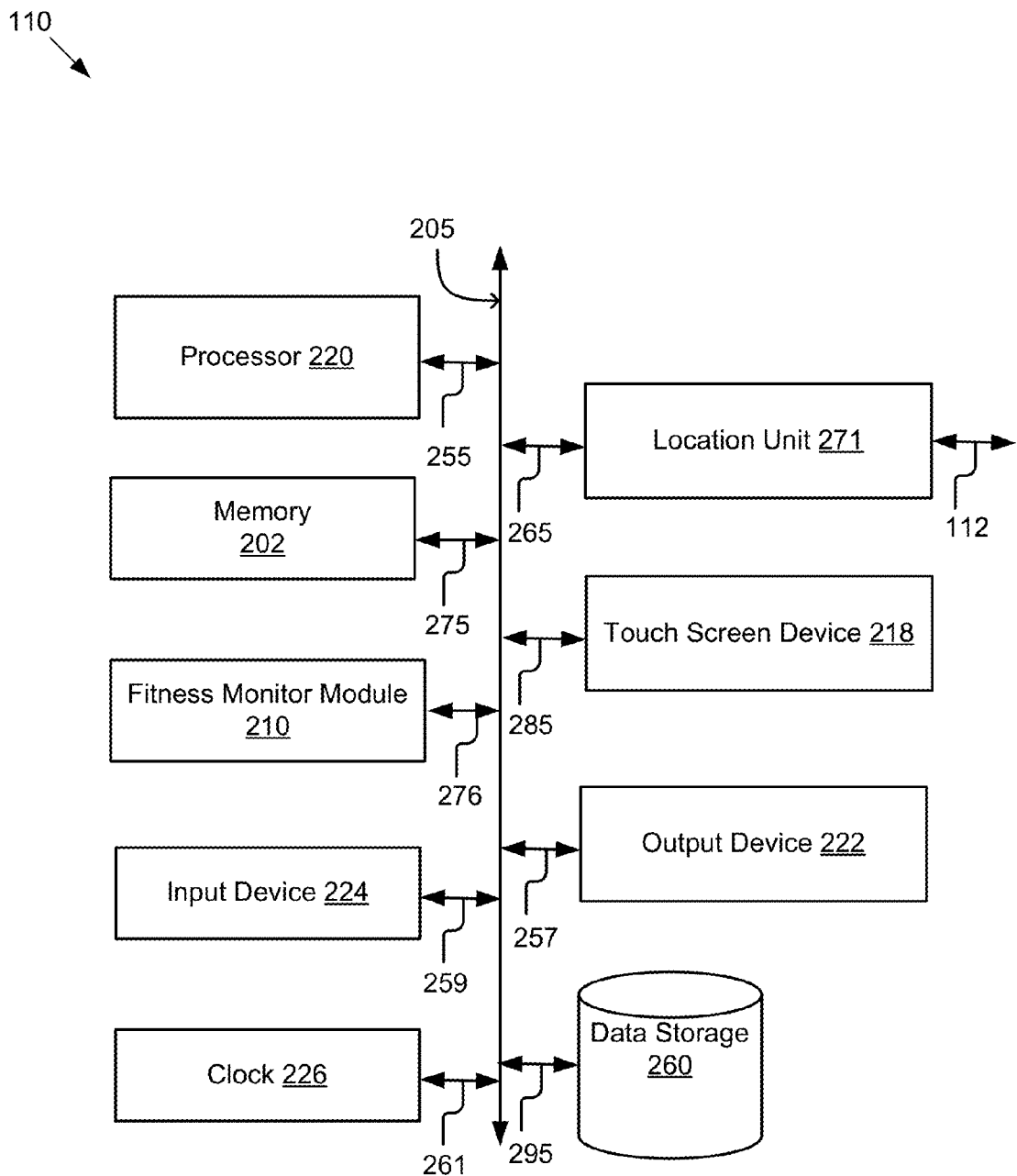
FIG. 2 is a block diagram of a client device according to one embodiment.

FIG. 2 is a block diagram of a client device 110. The client device 110 comprises a processor 220, a memory 202, a location unit 271, a touch screen device 218, an input device 224, an output device 222, a data storage 260 and a fitness monitor module 210 stored on the memory 202.

The touch screen device 218 is any conventional touch screen, sensors, digitizing tablet or graphics pad. The touch screen device 218 includes cursor control to communicate positional data as well as command selections to the processor 220. The touch screen device 218 is coupled to the bus 205 for communication with the other components via signal line 285. Persons of ordinary skill in the art will recognize that the touch screen device 218 is only one embodiment and that user information can also be input via the input device 224.

The input device 224 is a keyboard, keypad, input buttons, microphone, etc. In one embodiment, the input device 224 is a voice recording device that is configured to capture audio signals and output the captured audio signals in digital form. The input device 224 is coupled to the bus 205 for communication with the other components via signal line 259. The output device 222 is a display, speakers, vibration motor, etc. In one embodiment, the output device 222 is a speaker for outputting audio signals. The output device 222 is coupled to the bus 205 for communication with the other components via signal line 257.

The processor 220 comprises an arithmetic logic unit, a microprocessor, a general purpose controller or some other processor array to perform computations and provide electronic display signals to a display device. The processor 220 is coupled to the bus 205 for communication with the other components via signal line 255. Processor 220 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 202 stores instructions and/or data that may be executed by the processor 220. The memory 202 is coupled to the bus 205 for communication with the other components via signal line 275. The instructions and/or data may comprise code for performing any and/or all of the techniques described herein. In one embodiment, the memory 202 comprises a dynamic random access memory (DRAM) device, a static random access memory (SRAM) device, flash memory or some other memory device known in the art. In one embodiment, the memory 202 is a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis. In another embodiment, the memory 202 comprises a combination of persistent memory and non-persistent memory.

The location unit 271 receives data from a data source 140, a social network server 101 or another client device. The location unit 271 transmits the data to the fitness monitor module 210. The location unit 271 is coupled to the bus 205 via signal line 265. In one embodiment, the location unit 271 includes a wireless transceiver for exchanging data with the network 130, or with another communication channel, using one or more wireless communication methods, such as IEEE 802.11, IEEE 802.16, BLUETOOTH® or another suitable wireless communication method. In another embodiment, the location unit 271 includes a cellular communications transceiver for sending and receiving data over a cellular communications network such as via short messaging service (SMS), multimedia messaging service (MMS), hypertext transfer protocol (HTTP), direct data connection, WAP, email, etc. In another embodiment, the location unit 271 includes a port for direct physical connection to the network 130 or to another communication channel. For example, the location unit 271 includes a USB, SD, CAT-5 or similar port for wired communication with the network 130. In one embodiment, the location unit 271 includes a global positioning system (GPS) receiver that determines position data, e.g. digital latitude longitude and elevation data, based on GPS data received from GPS satellites. Alternatively, the location unit 271 receives information from cellular towers that provide a triangulation mechanism. In another embodiment, location unit 271 receives signal strength measurements from known locations of WiFi access points or BlueTooth devices.

The clock 226 is a conventional type and provides an indication of local time that is transmitted to the fitness monitor module 210. In particular, the clock 226 is used to provide a local time at which a user starts and stops travelling. This time value is stored with the location data from the location unit 217. The clock 226 is adapted to communicate this information to the processor 302 and the fitness monitor module 210 via signal line 261.

The data storage 260 is any device capable of holding data, like a hard drive, compact disk read-only memory (CD-ROM), DVD, or a solid-state memory device. The data storage 260 is a non-volatile memory device or similar permanent storage device and media. The data storage 260 stores data and instructions for the processor 220 and comprises one or more devices including a hard disk drive, a floppy disk drive, a CD-ROM device, a DVD-ROM device, a DVD-RAM device, a DVD-RW device, a flash memory device, or some other mass storage device known in the art. In one embodiment, the data storage 260 is used to store user profiles and other information identifying users 125 of the client device 110. In some embodiments, such user data is stored in the data storage 260. In other embodiments, such user data is stored in the memory 202. In yet other embodiments, the user data is stored both in the data storage 260 and memory 202.

The fitness monitor module 210 software including routines for tracking a user's location, generating user interface for displaying information to the user, generating audio information and providing information about other users for the purpose of competition. The fitness monitor module 210 is coupled to the bus 205 via signal line 276. The fitness monitor module 210 is described in greater detail below.

Fitness Monitor Module 210

Figure 3:
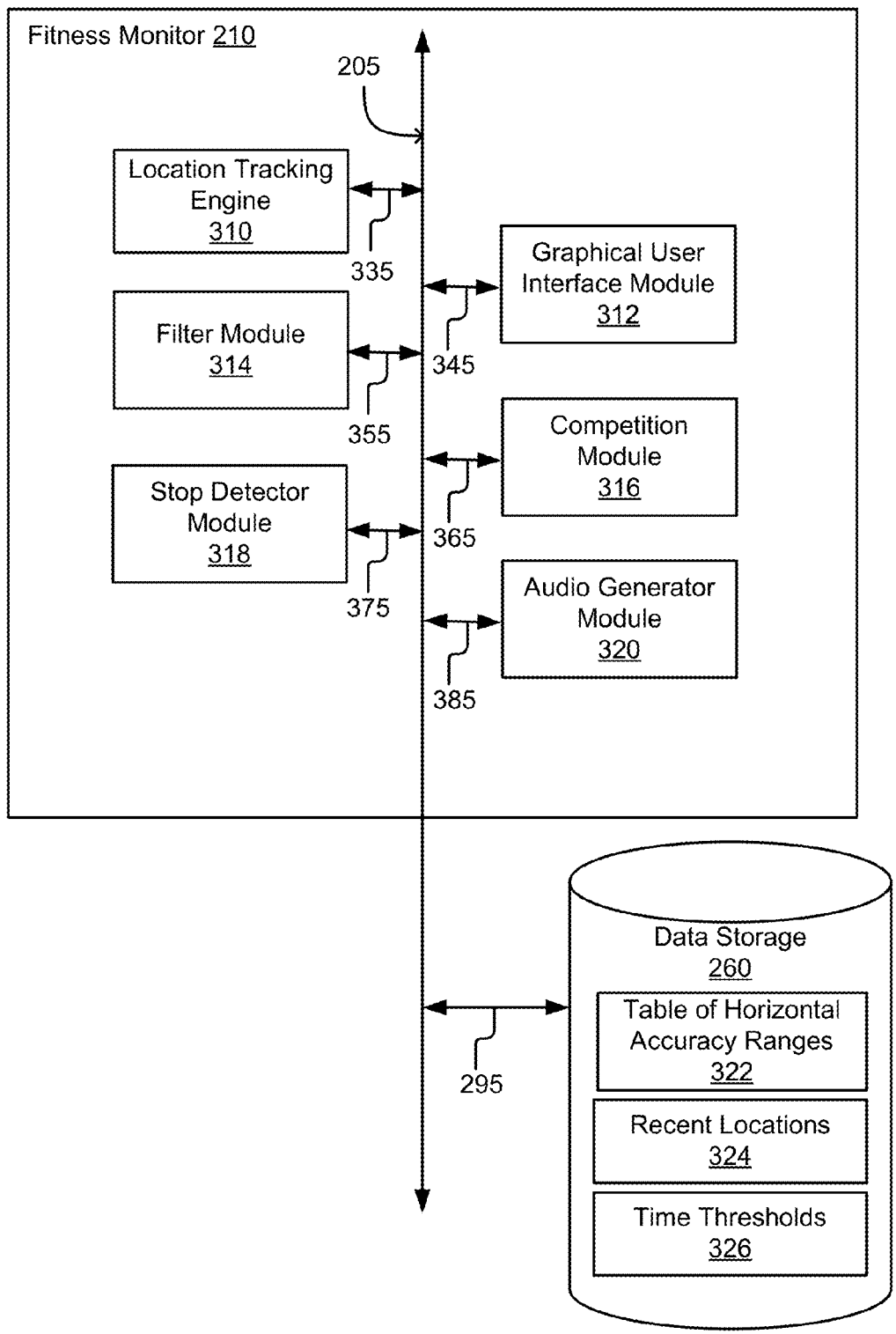
FIG. 3 is a block diagram of fitness monitor according to one embodiment.

FIG. 3 illustrates the fitness monitor 210 and the data storage 260 in more detail. In one embodiment, the fitness monitor 210 comprises a location tracking engine 310, a graphical user interface module 312, a filter module 314, a competition module 316, a stop detector module 318 and an audio generator module 320. Persons of ordinary skill in the art will recognize that the fitness monitor 210 can also include a heart rate monitor, a cycling speed and cadence monitor, a strike cadence for runners, a power meter, etc.

The location tracking engine 310 is software including routines for tracking a geographic location of the client device 110. In one embodiment, the location tracking engine 310 is a set of instructions executable by the processor 220 to provide the functionality described below for requesting and receiving location information from the location unit 271. The location tracking engine 310 is coupled to the bus 205 for communication with the processor 220 and other components of the client device 110 via signal line 335.

In one embodiment, the location tracking engine 310 tracks the location, speed and distance traveled by the client device 110 during an activity that is performed by user 125. The location tracking engine 310 requests and receives one or more location updates from the location unit 271. In one embodiment, the location tracking engine 310 receives GPS information from the location unit 271. In another embodiment, when GPS data is not available, the location tracking engine 310 receives information about the client device's 110 location from WiFi access points or cell towers. In one embodiment, a location update includes latitude, longitude and elevation data. In another embodiment, the location update includes a timestamp that indicates a location of the client device 110 at a particular time. In one embodiment, the location tracking engine 310 requests and/or receives location information at a predetermined time interval from the location unit 271. In another embodiment, the location tracking engine 310 sends the location update to the filter module 314 to determine whether the location update is acceptable (i.e. qualifies for storage) based on testing of the location update.

In one embodiment, the location tracking engine 310 maintains recent locations 324 and stores the recent locations 324 in data storage 260. In one embodiment, recent locations 324 are stored in a queue data structure that is transmitted to the filter module 314 before it is stored as a recent location 324 in the data storage 260 to ensure that all outliers are removed. In one embodiment, the location tracking engine 310 computes performance information based on location updates received from the location unit 271. The performance information includes at least one of speed, time, distance, energy, etc. For example, the location tracking engine 310 computes an instantaneous speed for a location update.

In one embodiment, the location tracking engine 310 receives a location update and compares the location update with a selected map or route. In one embodiment, the location tracking engine 310 determines whether the client device 110 is located within a predetermined distance of the route. In another embodiment, the location tracking engine 310 determines an instruction for navigating the user 125 based on location information and the selected map or route. In another embodiment, the location tracking engine 310 identifies a plurality of angles ahead of a current location on a path, identifies a most acute angle from the plurality of angles and determines a direction based on the most acute angle. The location tracking engine 310 transmits the instruction to the audio generator module 320 for generating an audio prompt or the graphical user interface module 312 for generating a display.

The graphical user interface module 312 is software including routines for generating a user interface that receives inputs from the user 125 and displays information to the user 125 such as the user's 125 maps, graphs and a calendar that are organized by routes and activities, and include a list of how much the user 125 traveled in the last day, week, month, year and overall. The information is received directly from the location tracking engine 310 and the stop detector module 318 or is retrieved from data storage 260. The graphical user interface module 312 transmits the user interface via the location unit 271 to a client device 110, such as a mobile device. In one embodiment, the graphical user interface module 312 is a set of instructions executable by the processor 220 to provide the functionality described below for receiving inputs from user 125 and/or displaying information to user 125. The graphical user interface module 312 is coupled to the bus 205 for communication with the processor 220 and other components of the client device 110 via signal line 345.

In one embodiment, the graphical user interface module 312 generates a user interface that provides the user with an option to designate a start point or a stop point. The graphical user interface module 312 transmits the start and stopping points to the location tracking engine 310, which automatically starts and stops recording time and locations as the client device 110 enters a certain perimeter around a start or stopping point. This is useful, for example, for automatically stopping once the client device 110 crosses the finish line.

In another embodiment, the graphical user interface module 312 generates a user interface for sharing the user's 125 information with a social network 101. For example, the graphical user interface module 312 shares the user's workouts with as Facebook or Twitter, emails a link to a map (such as Google maps) of the user's 125 route and emails a selected set of people the user's statistics, for example, to notify the people of the user's 125 progress in training for a marathon.

The filter module 314 is software including routines for detecting and filtering location updates that are outliers and therefore unacceptable. In one embodiment, the filter module 314 is a set of instructions executable by the processor 220 to provide the functionality described below for detecting and filtering location updates from the location tracking engine 310. The filter module 314 is coupled to the bus 205 for communication with the processor 220 and other components of the client device 110 via signal line 355.

In one embodiment, the filter module 314 performs an outlier test on a location update to determine whether the location update is an outlier with respect to a most recently accepted location update. The filter module 314 computes the distance between the new location and the most recently received location. If the distance is below a minimum outlier distance threshold, the new location is accepted as a recent location 324 and stored in the data storage 260. If the location update is an outlier, then the filter module 314 discards the location update.

The filter module 314 maintains a table of valid speed ranges for various activities such as walking, running, cycling, rowing and driving. The filter module 314 computes the difference between the timestamp of the new location and the most recently received location to determine the instantaneous speed. Based on the table and the instantaneous speed, the filter module 314 calculates a speed score.

The filter module 314 also maintains a table of valid horizontal accuracy ranges 322 and stores the table in data storage 260. The filter module 314 determines a horizontal accuracy score based on an accuracy of the location update. In one embodiment, the filter module 314 combines the speed score and the horizontal accuracy score, giving each equal weight and if the resulting score exceeds a threshold amount (e.g. 49%), the filter module 314 discards the new location.

In another embodiment, the filter module 314 determines whether the location update is a duplicate of a most recently received location update. If the location update is a duplicate, then the filter module 314 filters the location update. The filter module 314 is explained in greater detail below with reference to FIGS. 10A and 10B.

The competition module 316 is software including routines for comparing at least one competition workout with a current workout performed by the user 125. In one embodiment, the competition module 316 is a set of instructions executable by the processor 220 to provide the functionality described below for comparing at least one competition workout with a current workout. The competition module 316 is coupled to the bus 205 for communication with the processor 220 and other components of the client device 110 via signal line 365.

In one embodiment, the competition workout is a past workout that was performed by the user 125. The user 125 selects a past workout via the user interface and the competition module 316 compares the past workout with the current workout during and after an activity. The competition module 316 calculates a best performance, a medium performance and a worst performance. The competition module 316 also generates information that is transmitted to the audio generator module 320 for notifying the user of progress, such as "Behind best 37 seconds."

In another embodiment, the competition workout is a workout that is generated and shared by a second user for real-time competition. For example, the second user transmits a workout data file to a social network, such as Twitter or Facebook, to post a message that includes access to the workout data file. In one embodiment, the workout data file includes a map file of the workout. In another embodiment, the workout data file includes latitude, longitude and a timestamp of each point of the workout.

In one embodiment, the competition workout includes a route that is the same as the route that user 125 uses for the activity. In another embodiment, the routes are different but have the same distance. The user 125 competes against one or more competition workouts by importing the second user's workout data file to the client device 110. The competition module 316 determines progress of user 125 during the activity by collecting location updates. The competition module 316 compares the location updates with the second user's competition workouts and provides feedback based on the comparison. For example, the competition module 316 compares the user's distance at minute 1:00 to the second user's distance at 1:00. The type of feedback includes audio, visual or haptic (e.g. instructing the client device 110 to vibrate).

In one embodiment, multiple users preload a plan for a race and the competition module 316 tracks the route and where users are expected to be at each point of the race. The competition module 316 transmits the user's progress to the audio generator module 320 to give voice feedback as to whether the user is ahead or behind the target goal. In one embodiment, a tournament-style league of competitors use this feature to try and become a leader for a particular route, distance and/or age group. The competition module 316 is described in greater detail below with reference to FIG. 11.

The stop detector module 318 is software including routines for determining stops and stopped time during an activity that is performed by user 125 on the client device 110. In one embodiment, the stop detector module 318 is a set of instructions executable by the processor 220 to provide the functionality described below for determining stops and stopped time during an activity. The stop detector module 318 is coupled to the bus 205 for communication with the processor 220 and other components of the client device 110 via signal line 375. The stop detector module 318 is described in greater detail below with reference to FIGS. 10A-10B.

The audio generator module 320 is software including routines for generating audio signals based on progress of a user 125 during an activity. In one embodiment, the audio generator module 320 is a set of instructions executable by the processor 220 to provide the functionality described below for generating audio signals. The audio generator module 320 is coupled to the bus 205 for communication with the processor 220 and other components of the client device 110 via signal line 385.

In one embodiment, the audio generator module 320 is a media player that generates audio signals by decoding data in an audio format file such as an MP3 file, AAC file, WAV file or any type of audio or video format file. The audio signals are sent to an output device 222 such as a speaker or earphones for hearing by user 125.

In one embodiment, the audio generator module 320 receives instructions from the location tracking engine 310 or the competition module 316 to generate audio in response to one or more events that occur during an activity. An event is based at least in part on a location and/or performance. For example, when the location tracking engine 310 identifies that a user 125 passes a location that is associated with a particular audio data, the location tracking engine 310 instructs the audio generator module 320 to provides the audio data to the output device 222. Also, for example, when the speed of user 125 falls below a speed threshold, the location tracking engine 310 instructs the audio generator module 320 provides audio data to encourage the user 125 to increase speed. In another example, the audio generator module 320 receives instructions from the competition module 316 to update the user on the user's progress during a competition.

In one embodiment, the audio data is a custom voice recording. In one embodiment, an input device 224, such as a microphone, captures voice sounds for creating the audio data. The audio data is stored in data storage 360 as an MP3 file, AAC file, WAV file or any type of audio or video format file. In another embodiment, the audio generator module 320 receives audio data in an audio format file that a friend of user 125 that is shared on a social network. Custom voice recordings allow the user 125 to hear familiar voices and custom words of encouragement during a workout. Voices of people close to the user 125, such as a mentor, spouse, relative or friend, provide more effective motivation than a voice that is not familiar to user 125. In another embodiment, the audio data is an audio format file that is received from data source 140 via network 130. In the embodiment, data source 140 includes audio files having voices of celebrities or other entertaining voices. In another embodiment, the audio data is generated using a text-to-speech engine.

Graphical User Interface Module 312

Figure 4:
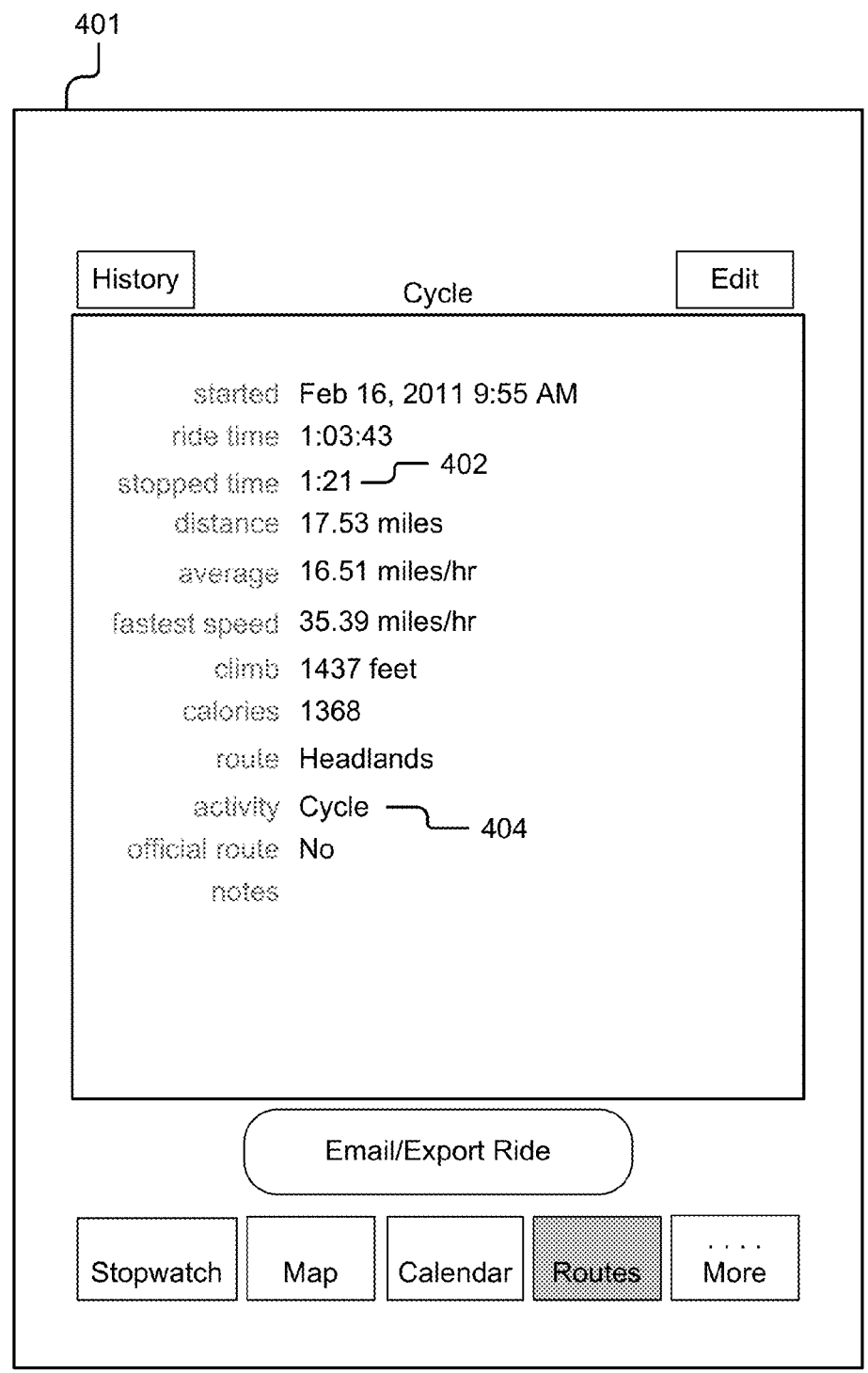
FIG. 4 is a graphic representation of a user interface for displaying performance information according to one embodiment.

Turning now to graphical user interface module 312, FIG. 4 is a graphic representation 401 of a user interface that is generated by the graphical user interface module 312 for displaying performance information and additional information for a workout on a route. In one embodiment, the graphical user interface module 312 receives performance information from the location tracking engine 310 and stopped time information from the stop detector module 318. In another embodiment, the graphical user interface module 312 retrieves information, such as the recent locations 324 from the data storage to ensure that the outliers were removed by the filter module 314.

The graphic representation 401 displays an amount of stopped time 402 for the activity 404. In one embodiment, the stop detector module 318 modifies the performance information by removing the amount of stopped time 402 from a total time of the activity. A result of removing the amount of stopped time 402 is improved accurate performance information such as average speed that does not include factors such as a user 125 being stopped at a light for a period of time. In another embodiment, the stop detector module 318 does not remove an amount of stopped time 402 from a total time of the activity to determine performance information.

Figure 5A:
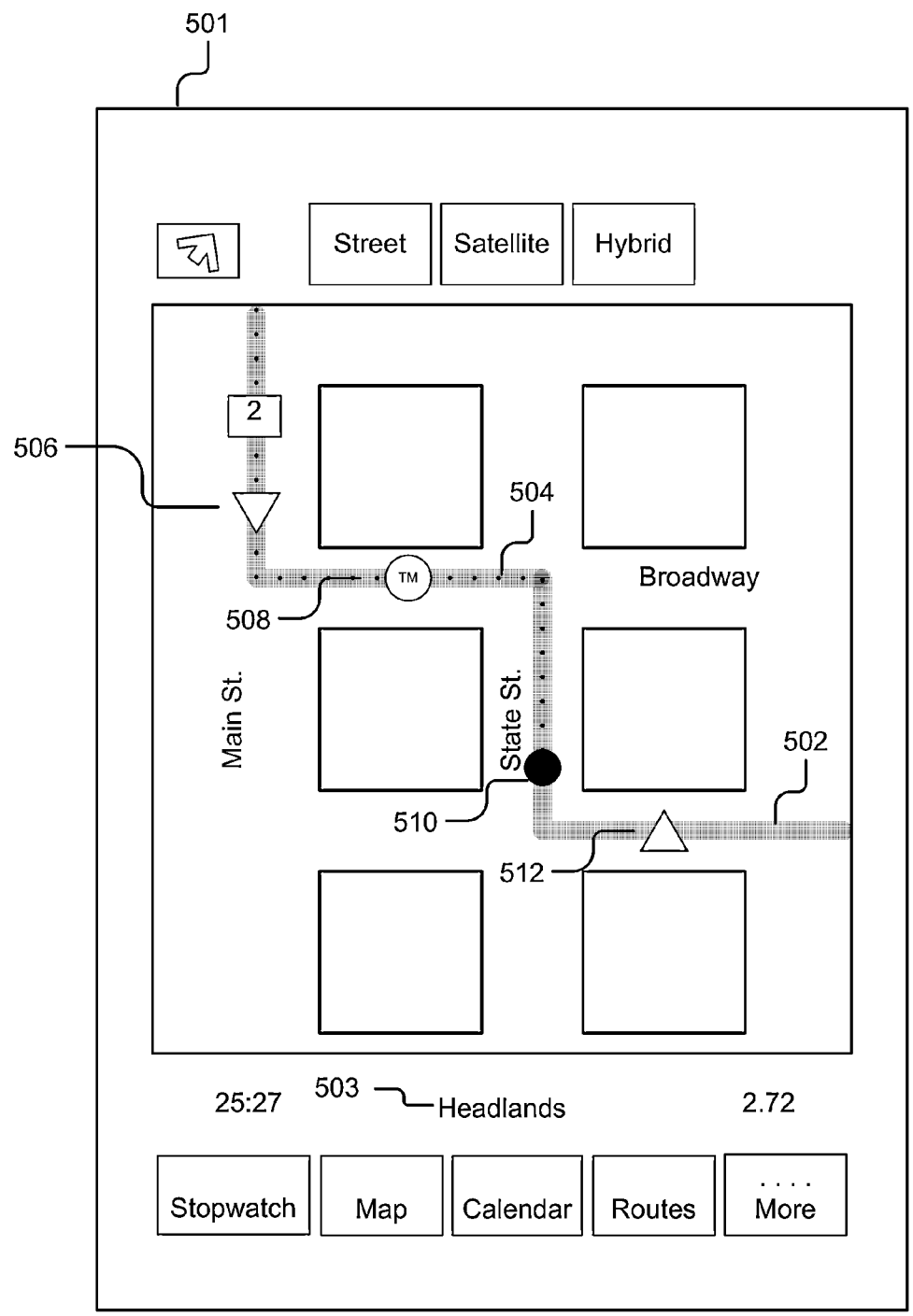
FIGS. 5A and 5B are graphic representations of user interfaces for displaying competition information according to one embodiment.

FIG. 5A is a graphic representation 501 of a user interface that is generated by the graphical user interface module 312 for displaying competition information. Graphic representation 501 displays a map including a route 502 that is selected by the user 125 for tracking a workout in real-time. Route 502 is associated with a name that is indicated by label 503. Mark 510 indicates the current location of the client device 110 during a current workout. The graphical user interface module 312 receives the current location from the location tracking engine 310. The location tracking engine 310 tracks the locations at a predetermined interval of the workout. In one embodiment, the interval is a time interval. In another embodiment, the interval is a distance interval. In one embodiment the location tracking engine 310 stores the locations with a queue of recent locations 324. Graphic representation 501 displays a path 504 that comprises the progress of the client device 110 during the workout.

Graphic representation 501 displays virtual competition relative to progress of the current workout. In one embodiment, the competition includes at least one past workout of user 125. Graphic representation 501 displays the progress of a current workout mark 510 relative to a location of a best workout 512 of user 125 and a location of a worst workout 506 of user 125.

In another embodiment, the competition includes at least one workout of a friend of the user 125. Graphic representation 501 displays the progress of the current workout relative to a location of a workout 508 of a friend of user 125. User 125 receives a workout file of a friend through messages on a social network. The workout file comprises at least one of a map file and data file. The data file includes at least latitude, longitude and time of each location of the friend's workout.

In one embodiment, the audio generator module 320 generates audio based on an event during the current workout. In one embodiment, the event is passing a predetermined location. For example, when the user 125 passes a finish line, the audio generator module 320 generates a sound that says "Way to go!" In another embodiment, the event is based on a performance threshold. For example, when the user 125 drops below a predetermined speed, the location tracking engine 310 instructs the audio generator module 320 to generate a sound that says "Go faster!"

In one embodiment, the audio generator module 320 generates audio based on a comparison between the current workout and at least one workout of a competitor. The competition module 316 compares the current location and the location of the friend 508 and instructs the audio generator module 320 to generate audio that includes a distance between the user 125 and a competitor. For example, the audio generator module 320 generates audio that says "Ahead of TM by 0.5 miles!"

Figure 5B:
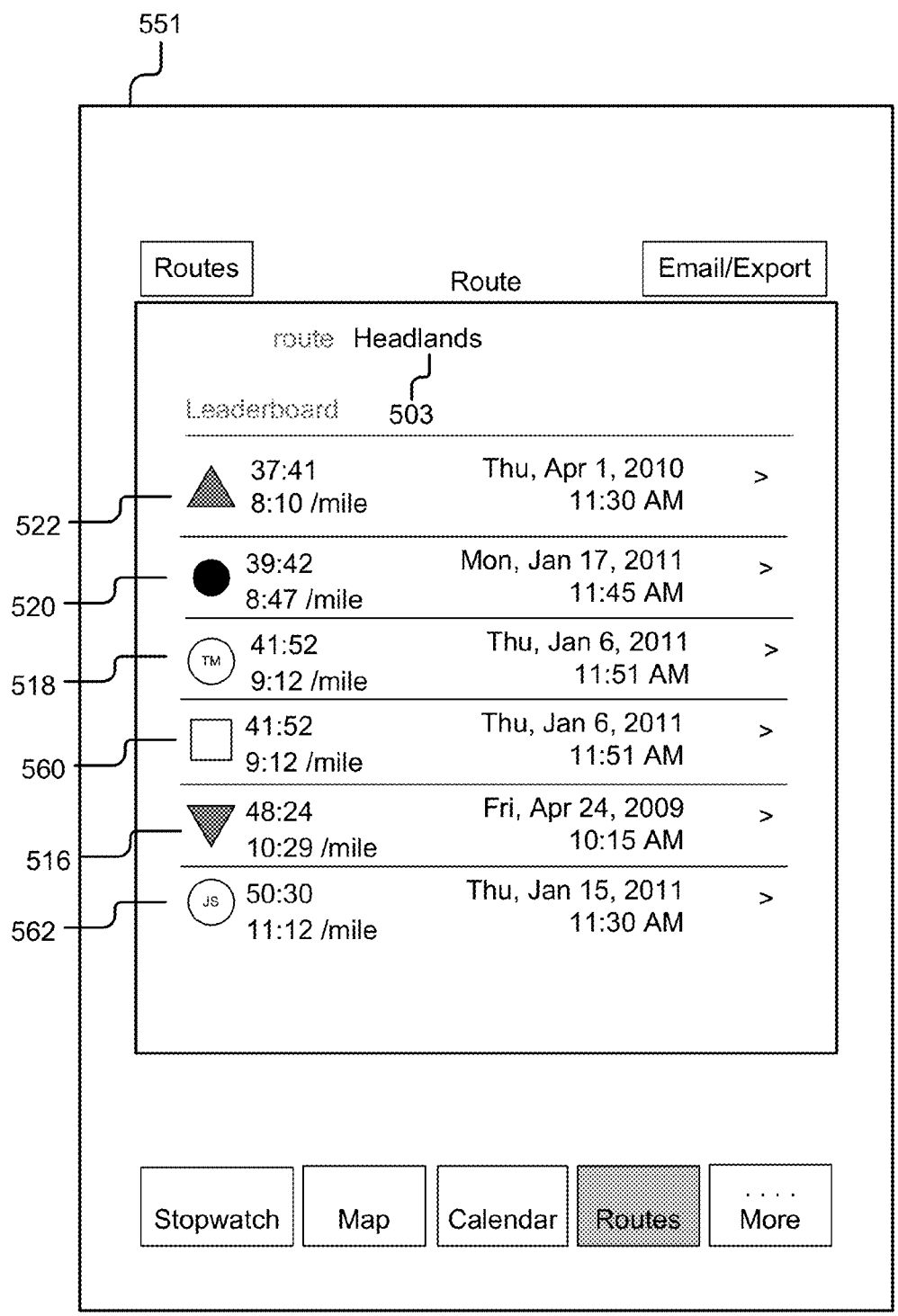

FIG. 5B is a graphic representation 551 of a user interface that is generated by the graphical user interface module 312 for displaying competition information. Graphic representation 551 displays a leaderboard of route 502 that is indicated by label 503. The leaderboard is a list of workouts that displays ranking of the workouts based on the performance of each workout. In one embodiment, the workouts are ranked by total time. For example, best workout 512 of user 125 is the top-ranked because it has the lowest time for the route 502 at 37:41.

In one embodiment, the leaderboard includes past workouts, the best workout 512, the worst workout 506 and the current workout 510 of user 125. The best workout 512 is the top-ranked workout at line 522. The worst workout 506 is the fifth-ranked workout at line 516. The current workout is second-ranked workout at line 520. In another, embodiment the leaderboard includes a median workout 560 of user 125 that is the fourth-ranked workout at line 560. The median workout 560 is the workout which is the median of all workouts of user 125 when on the route 502. In another embodiment, the leaderboard includes workouts of other competition, workouts 508 and another competitor's workout. Workout 508 is the third-ranked workout at line 518. The other competitor's workout is bottom-ranked at line 562.

In one embodiment, workouts of the competitors are workouts of friends of user 125 on a social network. In another embodiment, the workouts 518 and 562 are workouts of users in a common group of user 125 on a social network. In one embodiment, the common group is based on at least one of age, skill level, a route and distance. The users in the common group share at least one workout of a common route to form the leaderboard. Therefore, the leaderboard could be a scorecard or scorekeeper for a league that comprises the users of the group. Each user competes to best the top-ranked workout at line 522. In one embodiment, the users compete on a common route. This is convenient because the users of the group can compete against each other without having to compete simultaneously. In another embodiment, the users don't compete on a common route, but different routes of the same distance. This is convenient when users are remote from each other but still would like to compete against each other.

Figure 6:
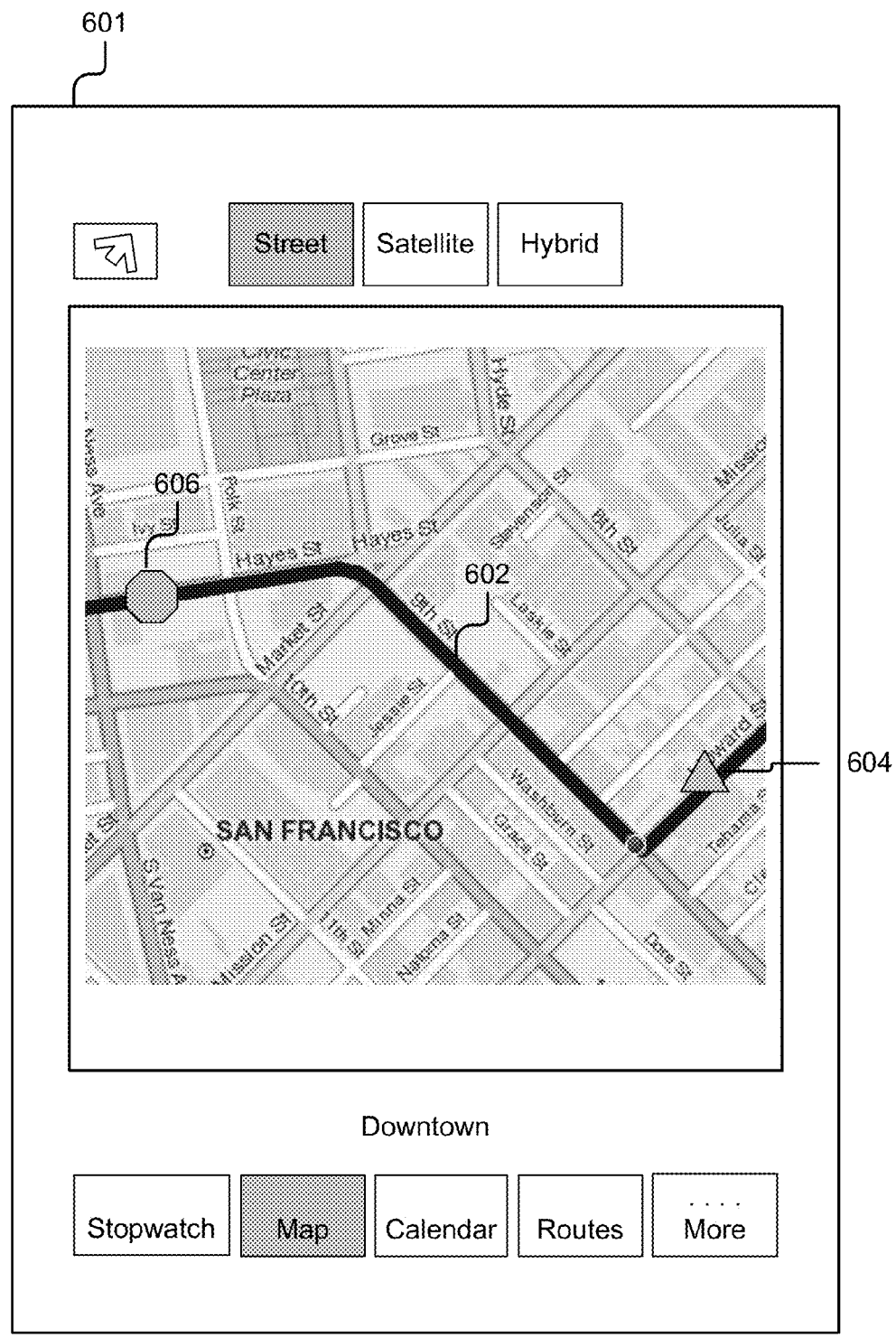
FIG. 6 is a graphic representation of a user interface for selecting start and stop locations for an automatic timer according to one embodiment.

FIG. 6 is a graphic representation 601 of a user interface that is generated by the graphical user interface module 312 for selecting and displaying start and stop locations for an automatic timer. Persons of ordinary skill in the art will recognize that this is one example of a way to stop the timer and that in other embodiments, the stop detector module 318 determines when the client device 110 is stopped. Graphic representation 601 displays a map that includes route 602 that is selected by user 125. User 125 selects a beginning 604 for starting a timer. In one embodiment, the user 125 selects the beginning location 604 by tapping or pressing at any location along route 602. In another embodiment, user 125 provides coordinates, for example, longitude and latitude, to select a beginning location 604. In another embodiment, user 125 provides a physical address to select a beginning location 604.

The user 125 selects an ending location 606 for stopping the timer. The user 125 selects at least one of a beginning location 604, an ending location 606 and both a beginning location 604 and an ending location 606. When the client device 110 passes the beginning location 604 on route 602, the location tracking engine 310 starts a timer. When the client device 110 passes the ending location 606 on route 602, the location tracking engine 310 stops a timer. By providing an automatic timer, the user 125 is only timed on at least one part of a route that is specified by user 125. In one embodiment, the audio generator module 320 generates audio feedback in response to stopping or starting the timer. This is advantageous because the user 125 does not worry about controlling the client device 110 while concentrating on performing the activity. For example, the user 125 selects a beginning location 604 on route 602 that provides the user 125 a distance to warm-up. The user 125 does not want the time to cover the distance to be included in an overall time. The user 125 performs the activity on the route over the distance and the timer starts at begin location 604 when the user passes begin location 604. The user 125 can continue to concentrate on performing the activity without having to start or stop the timer.

Figure 7:
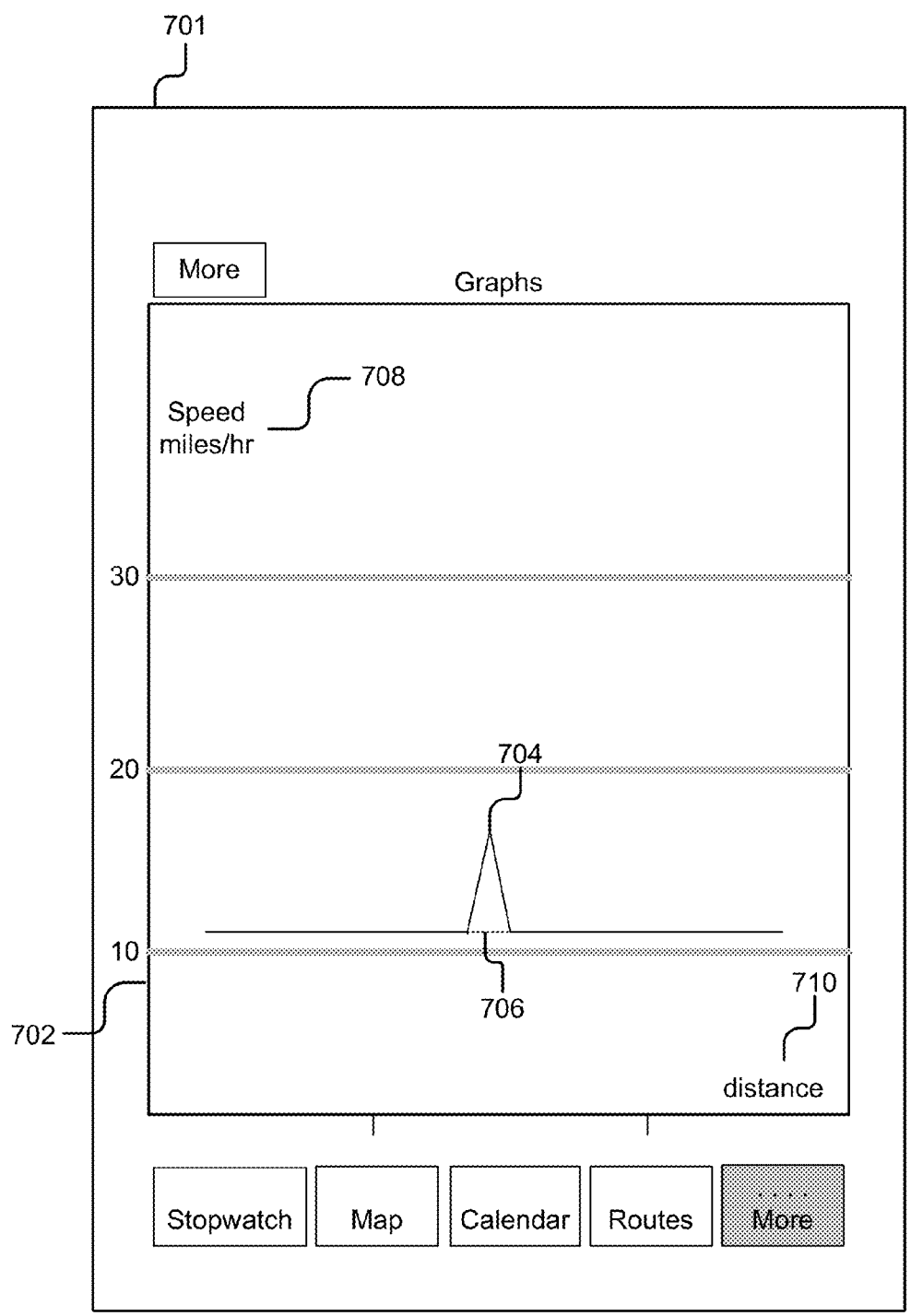
FIG. 7 is a graphic representation of a user interface for displaying speed information according to one embodiment.

FIG. 7 is a graphic representation 701 of a user interface for displaying speed information. Graphic representation 701 displays a graph 702 that reports instantaneous speed during performance of an activity by user 125. The vertical axis 708 of graph 702 represents the speed of user 125. The horizontal axis 710 of graph 702 represents distance of a workout on a route. In another embodiment, the horizontal axis 710 of graph 702 represents a time of a workout. Therefore, the graph 702 represents instantaneous speeds at various distances or time of the workout. The graph 702 shows a spike 704 in the instantaneous speed resulting from location tracking errors. Location tracking errors include wrong locations or outlier locations. The location tracking engine 310 removes the tracking errors and the graph 702 shows a more accurate representation of the instantaneous speed with line 706.

Location Tracking Engine 310

Figure 8A:
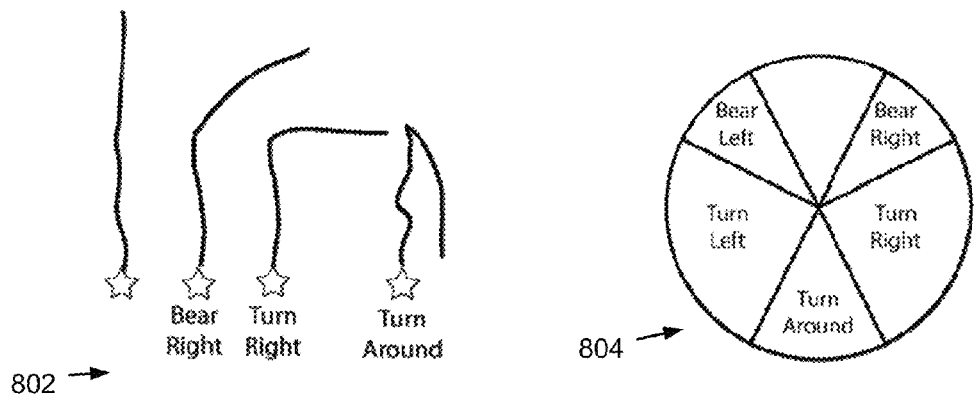
FIGS. 8A, 8B and 8C are graphical representations of examples of route tracking according to one embodiment.
Figure 8B:
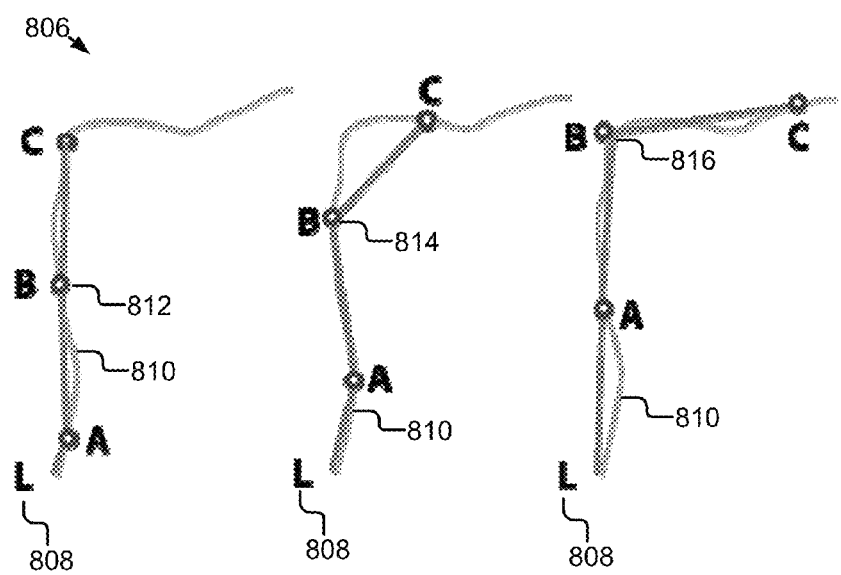
Figure 8C:
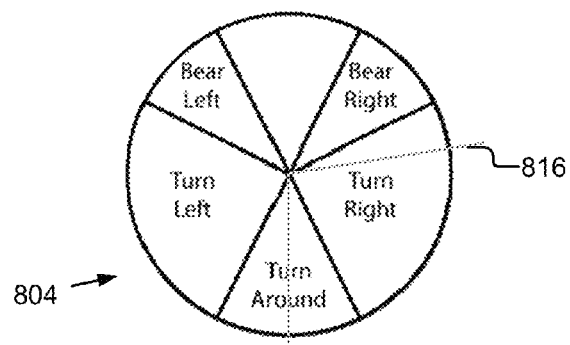

FIGS. 8A, 8B and 8C are illustrations for determining a general direction for guiding a user 125 based on a shape of the path ahead of a current location. FIG. 8A illustrates various directions 802 for guiding the user 125 based on the general direction or shape of the path ahead of a current location. In one embodiment, the directions 802 are based on the path corresponding to one of the angular sections 804. Each section of angular sections 804 corresponds to a general direction that is communicated to the user 125, such as turn left, bear left, bear right, turn right and turn around. One skilled in the art will recognize that any number of directions 802 and angular sections 804 can be used for guiding the user 125.

FIG. 8B illustrates determining a direction and an associated location for guiding the user 125. User 125 selects a route to follow during a workout. In one embodiment, the route is selected from a previous workout performed by user 125 or a friend of the user 125. In another embodiment, the route is imported from data source 140. In the embodiment, data source 140 stores file formats that represent routes using a series of latitude and longitude coordinates. In one embodiment, the file formats are GPS Exchange (GPX) or Keyhole Markup Language (KML) formats. One skilled in the art will recognize that any file format for representing route information can be used to select the route. In one embodiment, user 125 creates a GPX or KML file using a program or a web application, such as, dailymile.com or mapmyrun.com.

The user 125 begins the workout and the location tracking engine 310 tracks the current location L 808. In one embodiment, the location tracking engine 310 receives the current location L 808 by receiving location information from the location unit 271. In one embodiment, the location unit 271 transmits GPS data to the location tracking engine 310. If the GPS is unreliable, in one embodiment the location unit 217 transmits WiFi and cell tower data to the location tracking engine 310. In one embodiment, the location tracking engine 310 measures the distance from the current location L 808 to the route and if the distance is greater than a distance threshold, at least one of an audible announcement or a visible cue is generated for triggering a "recalculating route" response.

The location tracking engine 310 determines a direction based on a shape of the route just ahead of the current location L 808. The location tracking engine 310 determines the shape based on a plurality of angles identified by points on path 810. Path 810 is a portion of the route ahead of current location L 808 in the direction that the user 125 travels. A first angle 812 includes three points A, B and C. The location tracking engine 310 generates the first angle 812 by selecting points A, B, and C on the path 810 ahead of current location L in the direction of travel. The location tracking engine 310 selects point A of angle 812 based on a low threshold distance from current location L 808 to a point on path 810. In one embodiment, the low threshold distance is zero meters. In another embodiment, the low threshold distance is based on the type of activity by user 125. The location tracking engine 310 selects point B based on a constant distance from point A to a second point on path 810. In one embodiment, the constant distance is 100 meters. In another embodiment, the constant distance is based on the type of activity by user 125. The location tracking engine 310 selects point C based on the constant distance from point B to a third point on path 810. Therefore, the distance from point A to point B and the distance from point B to point C is the same.

The location tracking engine 310 incrementally increases the distance between current location L 808 and point A by moving point A along path 810 by an increment distance in the direction of travel. In one embodiment, the increment distance is based on the type of workout by user 125. Additionally, points B and C are moved to locations along path 810 that preserve the constant distance between points A and B and the constant distance between points B and C. The location tracking engine 310 generates a second angle 814 by moving the points A, B, C of first angle 812 in the manner described above. The location tracking engine 310 generates a third angle 816 by moving the points A, B, C of the second angle 814 by moving the points in the manner described above.

The location tracking engine 310 incrementally generates a plurality of angles until the distance between the current location L 808 and point A of a current angle is equal to or greater than a high distance threshold. In one embodiment, the high distance threshold is 200 meters. In another embodiment, the high distance threshold is based on the type of activity performed by user 125. Although FIG. 8B shows three angles, one skilled in the art will recognize that any number of angles can be generated by the location tracking engine 310.

The location tracking engine 310 determines a most acute angle from the plurality of angles. In one embodiment, the location tracking engine 310 remembers the most acute angle including the points of the most acute angle at each increment for generating the plurality of angles. At each increment, the current angle is compared to the most acute angle. If the current angle is more acute than the most acute angle, then the location tracking engine 310 remembers the current angle as the most acute angle. Otherwise, the most acute angle remains the same. In FIG. 8B, at a first increment, first angle 812 is the most acute angle to begin the process. At a second increment, the location tracking engine 310 remembers second angle 814 as the most acute angle since it is more acute than the most acute angle which is the first angle 812. At a third increment, the location tracking engine 310 remembers the third angle 816 as the most acute since it is more acute than the most acute angle which is the second angle 814.

The location tracking engine 310 determines the direction based on the most acute angle. The most acute angle corresponds to one of the angular sections 804 that corresponds to a direction. In the example, the third angle 816 is the most acute angle. FIG. 8C shows that the third angle 816 corresponds to a "turn right" direction. Before the user 125 arrives at the vertex of the third angle 816 or point B of the third angle 816, the location tracking engine 310 generates audio or visual feedback for communicating the direction. In one embodiment, if the most acute angle corresponds to a "straight" direction, then feedback is not generated. The location tracking engine 310 does not determine directions based on following a predetermined database of streets or paths. Thus, there is no need for storage or update of a massive database of streets or paths. Also, the location tracking engine 310 allows for determining directions for any arbitrary path.

One skilled in the art will recognize that other algorithms can be used to determine changes in direction. For example, a curve-fitting algorithm anticipates the general direction of a range of points, rather than using a specific point.

Methods

In one embodiment, data is stored in the storage device 202 and the data storage 260 of the client device 110, further described in conjunction with FIG. 2, so that execution of the data by the processor 220 included in the client device 110 causes execution of the functionality described below in conjunction with FIGS. 9A, 9B, 10A, 10B, 11 and 12.

Figure 9A:
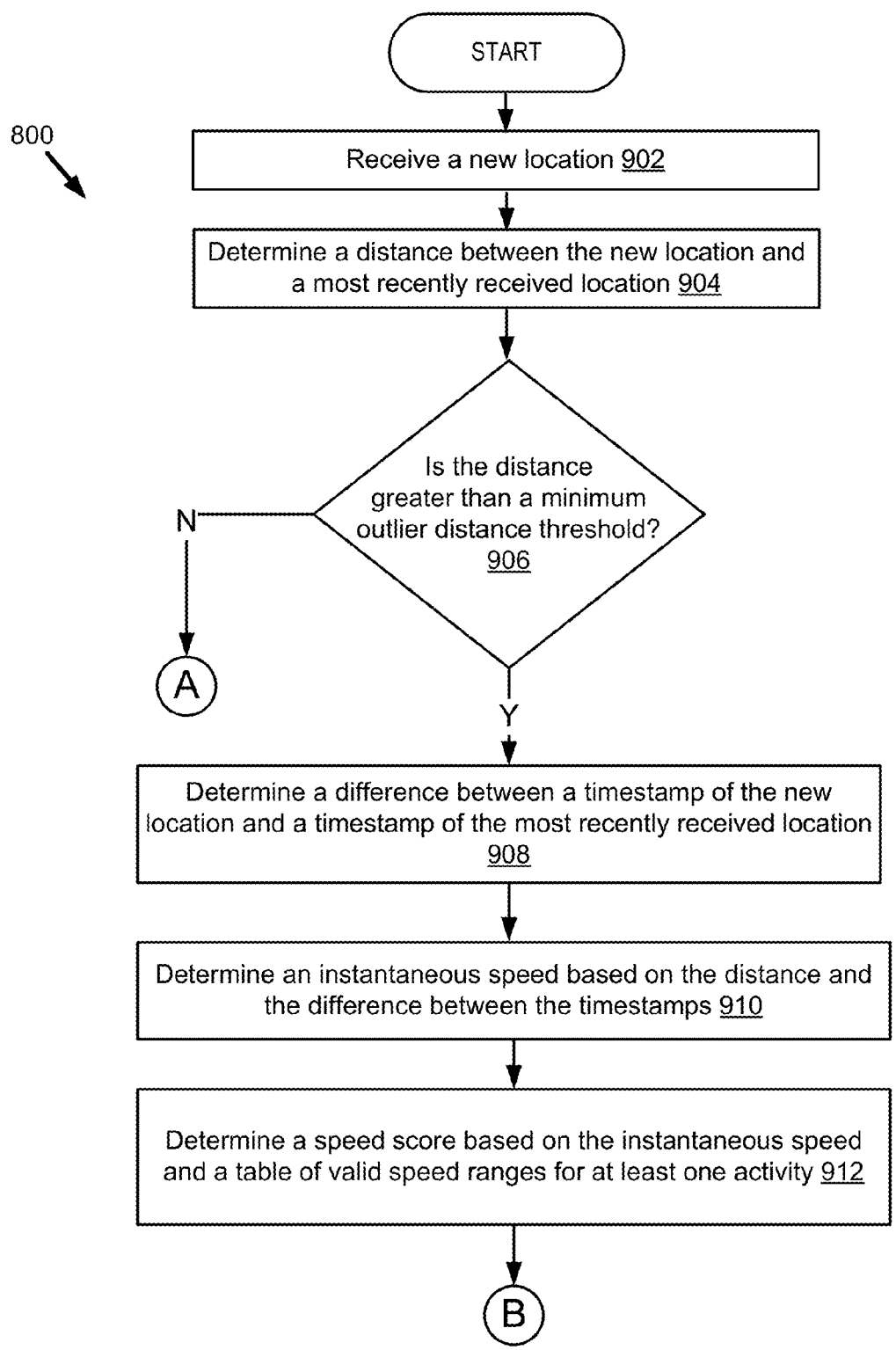
FIGS. 9A and 9B are a flow diagram of one embodiment of a method for determining outlier location updates according to one embodiment.
Figure 9B:
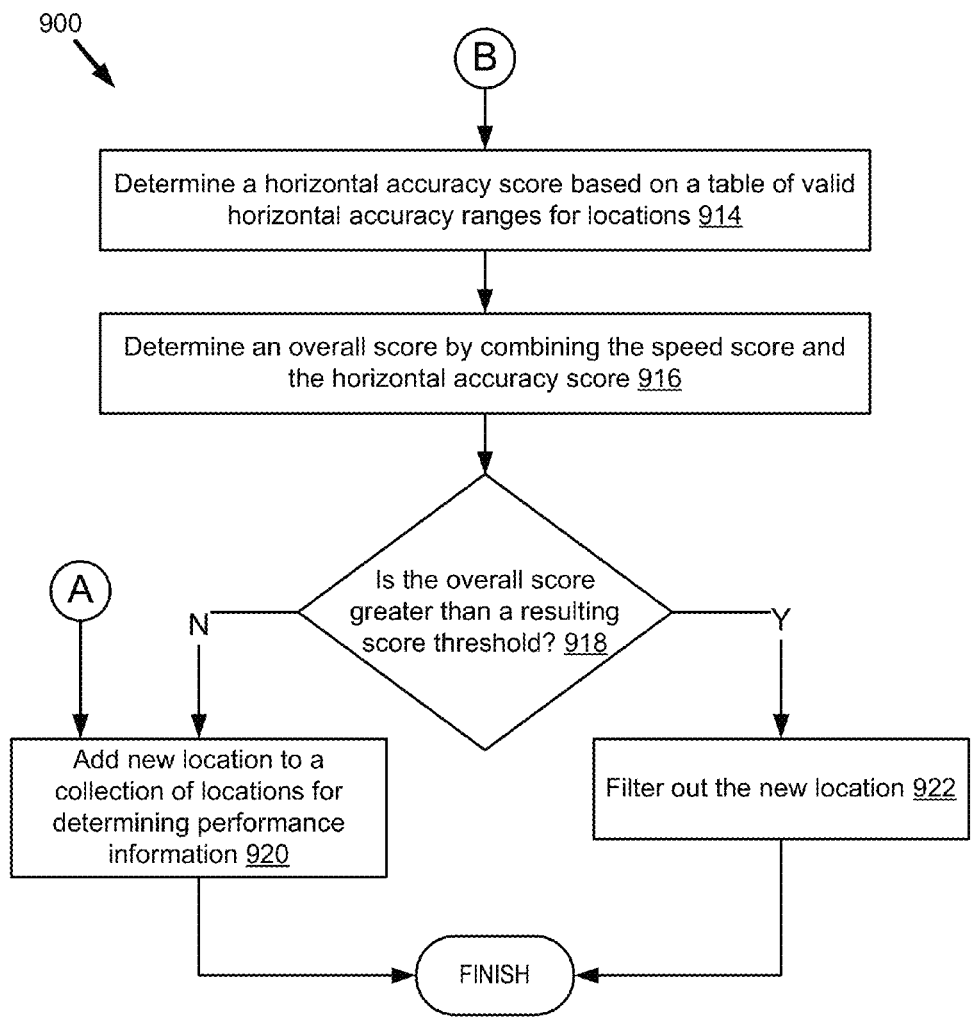

FIGS. 9A and 9B are a flow diagram 900 of one embodiment of a method for determining outlier location updates. The filter module 314 receives 902 a new location update from the location tracking engine 310. In one embodiment, a location update includes a latitude, longitude, timestamp and horizontal accuracy of a location. The filter module 314 determines 904 a distance between the new location update and a most recently received location update. In one embodiment, the most recently received location update is stored in data storage 260 with the recent locations 324. In one embodiment, recent locations 324 are stored in a queue data structure.

At step 906, the filter module 314 determines whether the distance between the new location update and the most recently received location update is greater than a minimum distance threshold. If the distance is less than the minimum distance threshold, method 900 moves to step 920. If the distance is greater than or equal to the minimum distance threshold, method 900 moves to step 908.

At step 908, the filter module 314 determines a difference between a timestamp of the new location update and a timestamp of the most recently received location update. The filter module 314 determines 910 an instantaneous speed based on the distance between the new location update and the most recently received location update and the difference between the timestamps.

The filter module 314 determines 912 a speed score that is based on the validity of the instantaneous speed and a table of valid speed ranges for various activities. For example, the speed ranges for walking is 0-5 miles per hour; the speed ranges for running is 0-10 miles per hour; and the speed ranges for cycling is 0-50 miles per hour.

Turning to FIG. 9B, at step 914, the filter module 314 determines 914 a horizontal accuracy score that is based on a table of valid horizontal accuracy ranges for locations. The horizontal accuracy score is based on the accuracy of the location reading. The accuracy is based on a distance radius of a circle centered at the location. The true location lies somewhere within the circle. In one embodiment, the filter module 314 retrieves the table of valid horizontal accuracy ranges 322 from data storage 260. At step 916, the filter module 314 determines 916 an overall score by combining the speed score and the horizontal accuracy score. The filter module 918 determines 918 whether the overall score is greater than a resulting score threshold. In one embodiment the resulting score threshold is 49% but persons of ordinary skill in the art will recognize that the resulting score threshold can be a different number. At step 918, if the overall score is not greater than the resulting score threshold, the method 900 moves to step 920.

At step 920, the filter module 314 determines that the new location update is not an outlier. Therefore, the filter module 314 adds 920 the new location update to the recent locations 324 for determining performance information of the activity by user 125. At step 918, if the overall score is greater than or equal to the resulting score threshold, the method 900 moves to step 922.

At step 922, the filter module 314 determines that the new location update is an outlier. Therefore, the filter module 314 filters 922 out the new location update. By filtering out outlier location updates, the competition module 316 computes more accurate performance information that is based on location updates.

Figure 10A:
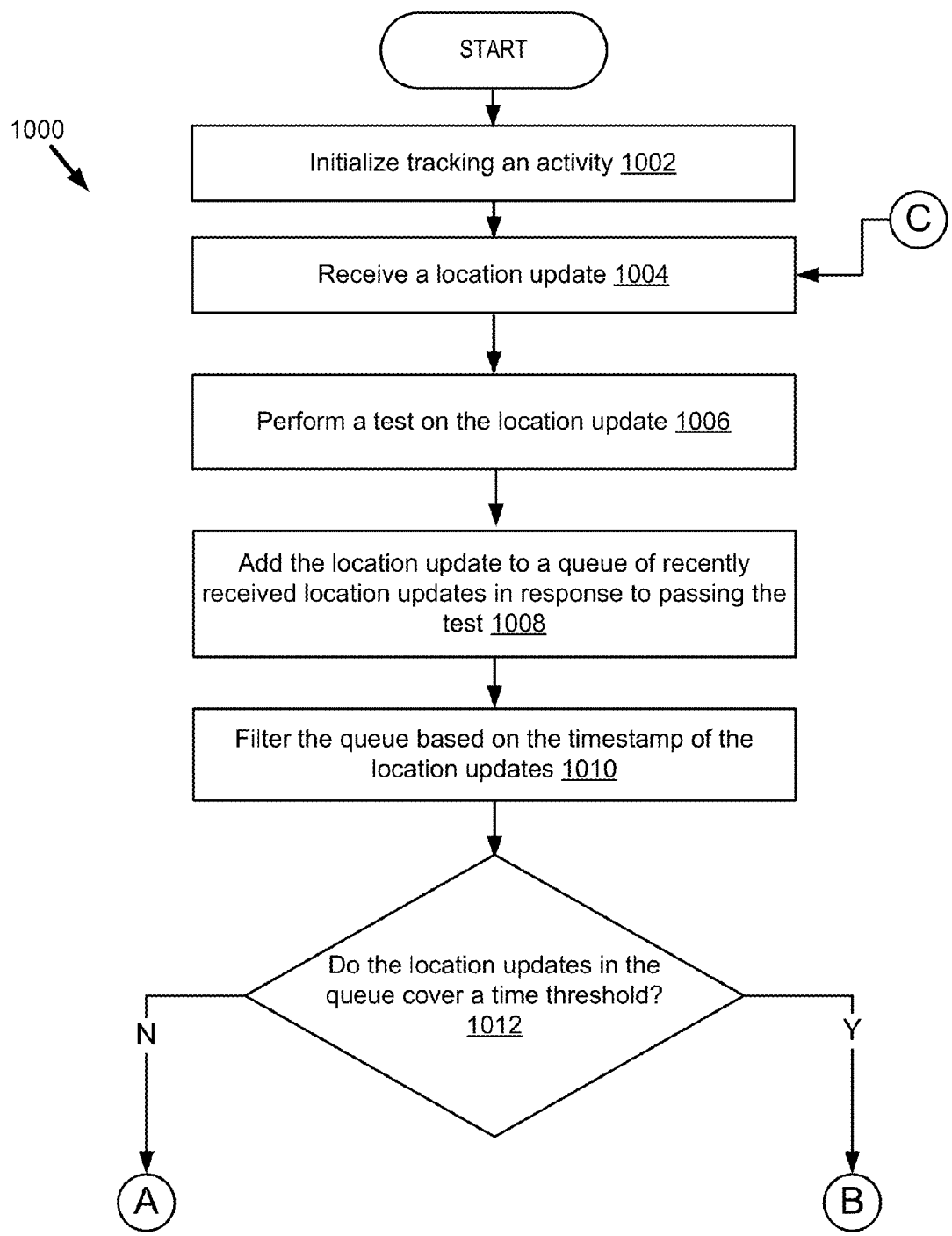
FIGS. 10A and 10B are a flow diagram of one embodiment of a method for determining stop time of an activity.
Figure 10B:
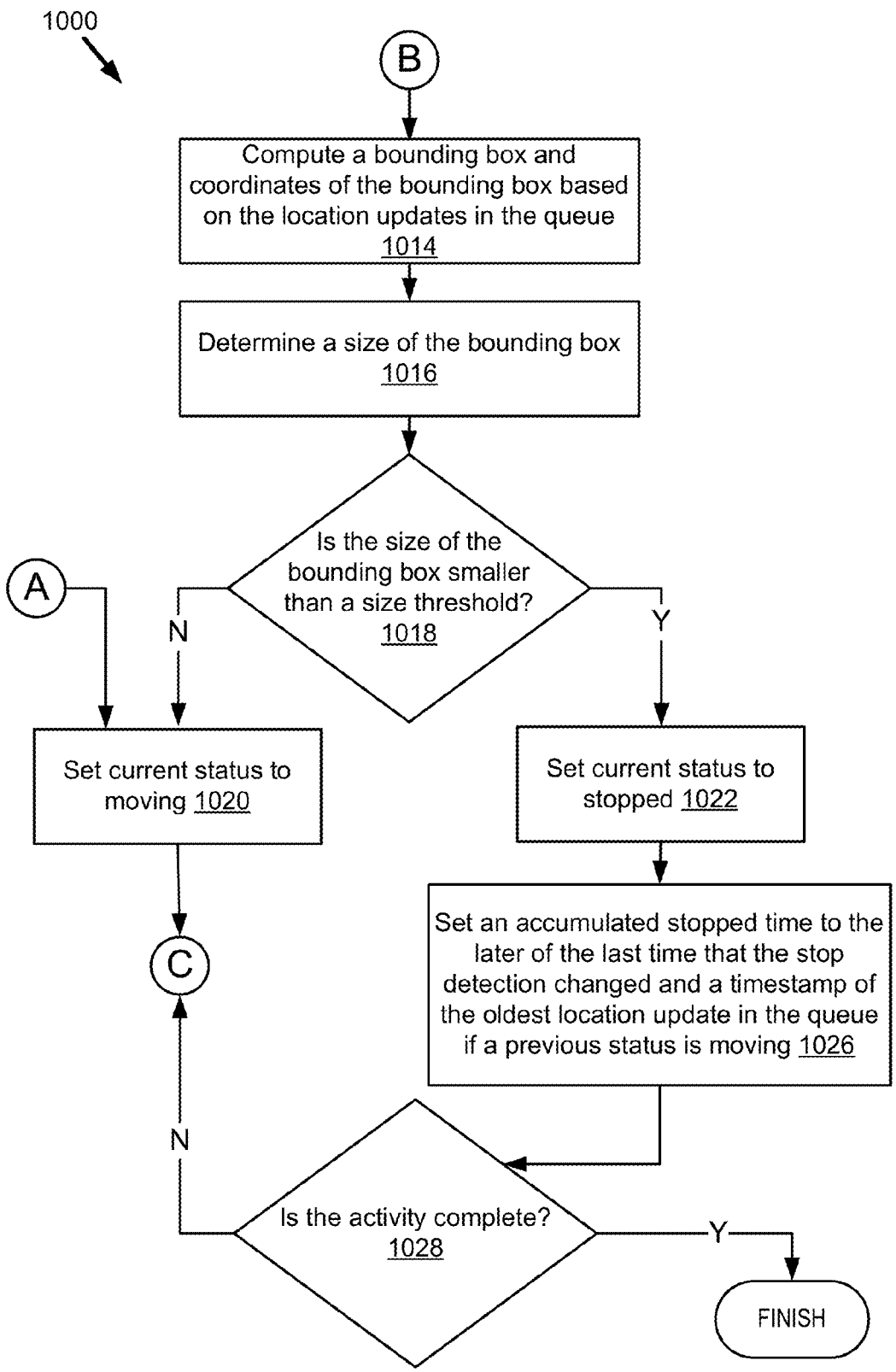

FIGS. 10A and 10B are a flow diagram 1000 of one embodiment of a method for determining a stop time of an activity. The location tracking engine 310 initializes 1002 tracking an activity performed by user 125. A filter module 314 receives 1004 a location update from the location tracking engine 310. The filter module 314 performs 1006 at least one test on the location update including calculating a horizontal accuracy. In one embodiment, the test is a comparison of a horizontal accuracy with a maximum threshold. If the location update's horizontal accuracy is greater than or equal to the maximum threshold, the filter module 314 does not transmit the location update to the stop detector module 318.

In another embodiment, the test is a determination of whether the location update is a duplicate when compared to a most recently received location update. The filter module 314 determines the difference between latitudes, longitudes and horizontal accuracies of the location update and the most recently received location update. If the differences are zero, then the location update is a duplicate and does not pass the test (i.e. the location update is excluded from the recent locations 324). In another embodiment, the at least one test comprises determining whether the location update is an outlier location, which is described in greater detail in FIGS. 9A-9B. If the location update is determined to be an outlier, then the location update does not pass the test.

At step 1008, the filter module 314 adds 908 the location update to a queue of recently received location updates in response to passing the test. The filter module 314 filters 1010 the queue of recently received location updates based on a timestamp of the location updates in the queue. The filter module 314 then transmits the queue of filtered location updates to the stop detector module 318.

At step 1012, the stop detector module 318 determines whether the location updates in the queue cover a time threshold. The time threshold is based on a type of the activity performed by user 125, such as walking, running, cycling, rowing and driving. If the location updates in the queue do not cover the time threshold, the method 1000 moves to step 1020. If the location updates in the queue do cover the time threshold, the method moves to step 1014.

Now turning to FIG. 10B, the stop detector module 318 computes 1014 a bounding box and coordinates of the bounding box based on the location updates in the queue. In one embodiment, the stop detector module 318 computes the size of the bounding box frequently because computing distances between coordinates is computationally expensive. The stop detection module 318 periodically maps coordinates to fixed distances to obtain scaling factors and only updates the scaling factors infrequently because the users do not move fast enough for the scaling factors to change significantly over short periods of time, such as one minute. The stop detector module 318 determines 1016 a size of the bounding box by computing the distances between the coordinates.

At step 1018, the stop detector module 318 determines whether the size of the bounding box is smaller than a size threshold. The size threshold is based on the type of the activity performed by user 125. For example, a walker will have a smaller bounding box than a bicyclist because the bicyclist travels a greater distance at a faster speed. If the size is greater than or equal to the size threshold, the method 1000 moves to step 1020. If the size is smaller than the size threshold, the method 1000 moves to step 1022.

At step 1020, the stop detector module 318 determines that the user 125 is moving and sets 1020 a current status to moving. The method 1000 then moves to step 1004 to wait for a new location update.

At step 1022, the stop detector module 318 determines that the user 125 is stopped and sets 1022 the current status to stopped. The stop detector module 318 sets 1026 an accumulated stopped time (i.e. a time that the client device 110 is not moving) to the later of the last time that the stop detection changed and a timestamp of the oldest location update in the queue if a previous status is moving. In other words, when the stop detector module 318 determines a transition from moving to stopped, the time of the stop detection change is set based on the stop detection change and the timestamp of the oldest location in the queue. At step 1028, the stop detector module determines whether the activity is complete. If complete, the method 1000 finishes. If not complete, the method 1000 moves to step 904.

Figure 11:
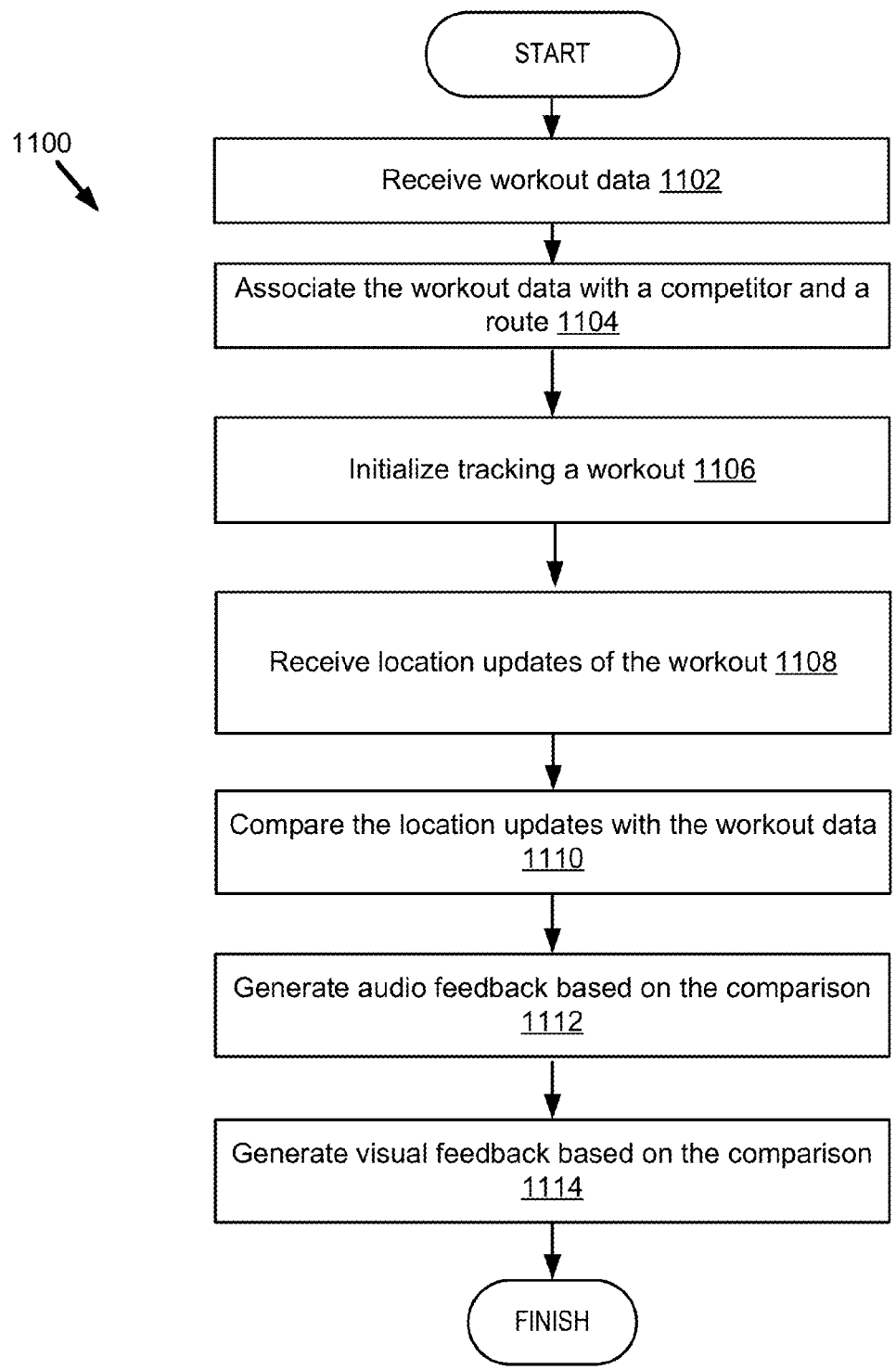
FIG. 11 is a flow diagram of one embodiment of a method for competition sharing.

FIG. 11 is a flow diagram 1100 of one embodiment of a method for competition sharing. The competition module 316 receives 1102 workout data. In one embodiment, the workout data is data that is shared by a friend of user 125 on a social network, such as the one running on the social network server 101. The competition module 316 associates the workout data with a competitor and a route. The location tracking engine 310 initializes 1106 tracking a workout or activity performed by user 125. The competition module 316 receives 1108 location updates from the location tracking engine 310. The competition module 316 compares 1110 the location updates with the workout data. The competition module 316 instructs the audio generator module 320 to generate 1112 audio feedback based on the comparison. In one embodiment, the competition module 316 instructs the graphical user interface module 312 to generate 1114 visual feedback based on the comparison.

Figure 12:
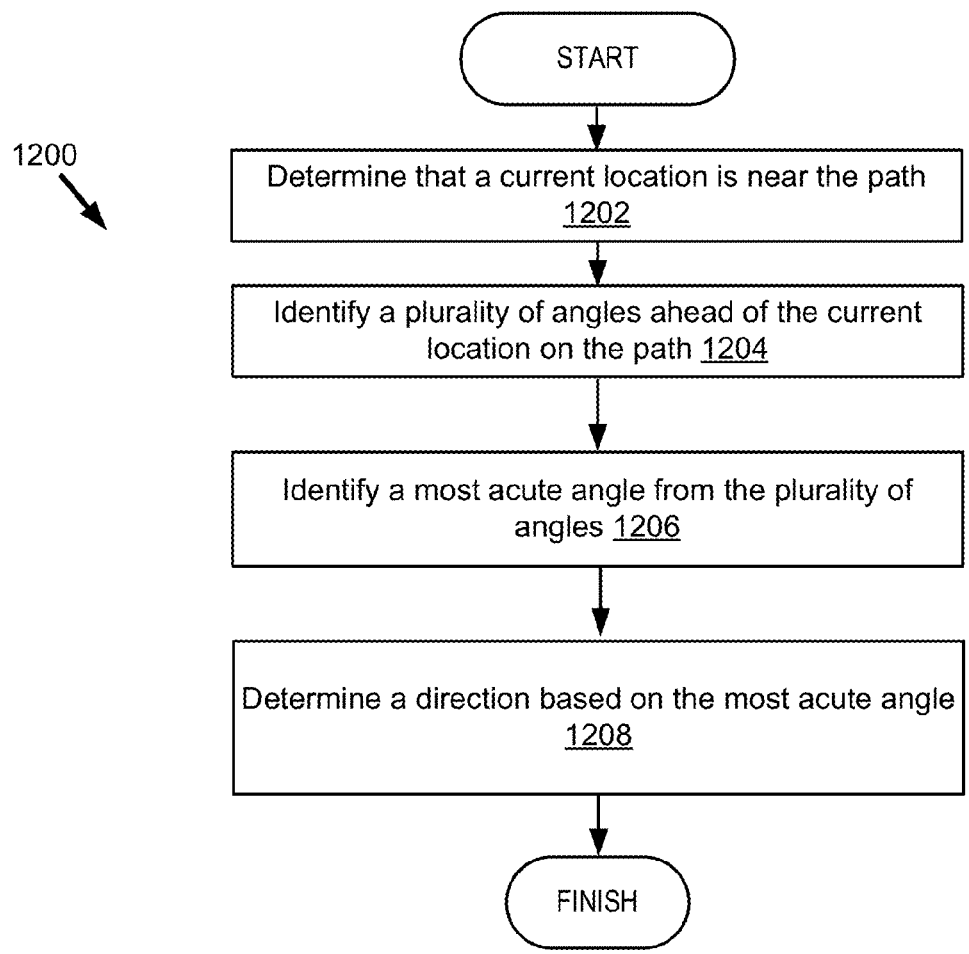
FIG. 12 is a flow diagram of one embodiment of a method for determining a direction for guiding a user on a route.

FIG. 12 is a flow diagram 1200 of one embodiment of a method for determining a direction for guiding a user on a route. The location tracking engine 310 determines 1202 that a current location of user 125 is near the path of the route. The location tracking engine 310 identifies 1204 a plurality of angles ahead of the current location on the path. The location tracking engine 310 identifies 1206 a most acute angle from the plurality of angles. The location tracking engine 310 determines 1208 a direction based on the most acute angle. In one embodiment, the direction is communicated to the user 125 by at least one of audio and visual communication.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method for tracking an activity, the method comprising:
   receiving a location update associated with a first user;
   performing a test on the location update, the test varying based on a type of the activity;
   adding the location update to a queue of location updates in response to the location update passing the test;
   determining an event occurring during the activity, the event associated with the location update and a performance of the first user while crossing a location of the location update during a past activity;
   providing a feedback to the first user corresponding to the event occurring during the activity;
   determining performance information associated with the first user based on the queue of location updates;
   computing a size of a bounding box based on a distance between location coordinates in the queue of location updates, the size of the bounding box varying based on the distance between location coordinates;
   determining a stop of the activity by comparing the size of the bounding box to a size threshold, the size threshold based on the type of the activity;
   determining a transition of the activity from stopped to moving;
   determining an accumulated stopped time; and
   modifying the performance information associated with the first user by removing the accumulated stopped time from a total time of activity of the first user.

2. The method of claim 1, further comprising filtering the queue based on a timestamp of the location updates.

3. The method of claim 1, wherein performing the test includes determining whether the location update is an outlier location update with respect to a most recently received location update.

4. The method of claim 1, wherein performing the test includes comparing a horizontal accuracy of the location update to a maximum accuracy threshold.

5. The method of claim 1, wherein performing the test includes determining whether the location update is a duplication of a most recently received location.

6. The method of claim 1 comprising obtaining a scaling factor based on the distance between the location coordinates in the queue of location updates.

7. The method of claim 1, wherein the type of the activity is one from the group of walking, running, cycling, rowing and driving.

8. The method of claim 1, wherein the bounding box is based on a scaling factor based on the distance between the location coordinates in the queue of location updates.

9. The method of claim 8, further comprising receiving workout data associated with a second user and comparing the location update received for the first user with the workout data associated with the second user.

10. The method of claim 9, further comprising providing feedback based on comparing the location update and the workout data.

11. A system for tracking an activity comprising:
   a filter module for receiving a location update associated with a first user, for performing a test on the location update, the test varying based on a type of the activity and for adding the location update to a queue of location updates in response to the location update passing the test, the queue including timestamps for the location updates;
   a location tracking engine coupled to the filter module, the location tracking engine for determining an event occurring during the activity, the event associated with the location update and a performance of the first user while crossing a location of the location update during a past activity, for providing a feedback to the first user corresponding to the event occurring during the activity and for determining performance information associated with the first user based on the queue of location updates; and
   a stop detector module coupled to the filter module, the stop detector for computing a size of a bounding box based on a distance between location coordinates in the queue of location updates, the size of the bounding box varying based on the distance between location coordinates, for determining a stop of the activity by comparing the size of the bounding box to a size threshold, the size threshold based on the type of the activity, for determining a transition of the activity from stopped to moving, for determining an accumulated stop time and for modifying the performance information associated with the first user by removing the accumulated stopped time from a total time of activity of the first user.

12. The system of claim 11, wherein performing the test includes determining whether the location update is an outlier location update with respect to a most recently received location update.

13. The system of claim 11, wherein performing the test includes comparing a horizontal accuracy of the location update to a maximum accuracy threshold.

14. The system of claim 11, wherein performing the test includes determining whether the location update is a duplication of a most recently received location.

15. The system of claim 11 comprising obtaining a scaling factor based on the distance between the location coordinates in the queue of location updates.

16. The system of claim 11, wherein the type of the activity is one from the group of walking, running, cycling and driving.

17. The system of claim 11, bounding box is based on a scaling factor based on the distance between the location coordinates in the queue of location updates.

18. The system of claim 17, further comprising a competition module for receiving workout data associated with a second user and comparing the location update received for the first user to the workout data associated with the second user.

19. The system of claim 18, wherein the competition module provides feedback based comparing the location update and the workout data.

20. A computer program product comprising a non-transitory computer useable medium including a computer readable program, wherein the computer readable program when executed on a computer causes the computer to:
receive a location update associated with a first user;
perform a test on the location update, the test varying based on a type of the activity;
add the location update to a queue of location updates in response to passing the test;
determine an event occurring during the activity, the event associated with the location update and a performance of the first user while crossing a location of the location update during a past activity;
provide a feedback to the first user corresponding to the event occurring during the activity;
determine performance information associated with the first user based on the queue of location updates;
compute a size of a bounding box based on a distance between location coordinates in the queue of location updates, the size of the bounding box varying based on the distance between location coordinates;
determine a stop of the activity by comparing a size of the bounding box to a size threshold, the size threshold based on the type of the activity;
determine a transition of the activity;
determine an accumulated stopped time; and
modify the performance information associated with the first user by removing the accumulated stopped time from a total time of activity of the first user.

21. A computer-implemented method for tracking an activity, the method comprising:
receiving a new location;
determining a distance between the new location and a most recently received location;
determining whether the distance is greater than a minimum outlier distance threshold based on a type of the activity;
responsive to the distance being greater than the minimum outlier distance threshold based on the type of the activity, determining a difference between a timestamp of the new location and a timestamp of the most recently received location;
determining an instantaneous speed based on the distance and the difference between the timestamps;
receiving a table of valid speed ranges for one or more types of activities performed by users;
determining a speed score based on the instantaneous speed and the table of valid speed ranges for one or more types of activities;
receiving a table of valid horizontal accuracy ranges for one or more locations;
determining a horizontal accuracy score based on an accuracy of reading of the new location and the table of valid horizontal accuracy ranges for one or more locations;
determining whether the overall score that is obtained by combining the speed score and the horizontal accuracy score is greater than a resulting score threshold; and
responsive to the overall score being greater than the resulting score, filtering out the new location.

22. A system for tracking an activity comprising:
a location tracking engine for receiving a new location; and
a filter module coupled to the location tracking engine, the filter module for determining a distance between the new location and a most recently received location, determining whether the distance is greater than a minimum outlier distance threshold based on a type of the activity, responsive to the distance being greater than the minimum outlier distance threshold based on the type of the activity, determining a difference between a timestamp of the new location and a timestamp of the most recently received location, determining an instantaneous speed based on the distance and the difference between the timestamps, receiving a table of valid speed ranges for one or more types of activities performed by users, determining a speed score based on the instantaneous speed and the table of valid speed ranges for one or more types of activities, receiving a table of valid horizontal accuracy ranges for one or more locations, determining a horizontal accuracy score based on an accuracy of reading of the new location and the table of valid horizontal accuracy ranges for one or more locations, determining whether the overall score that is obtained by combining the speed score and the horizontal accuracy score is greater than a resulting score threshold and responsive to the overall score being greater than the resulting score, filtering out the new location.

23. A computer-implemented method for determining a direction, the method comprising:
determining that a current location is near a pre-selected path;
identifying a first reference point, a second reference point and a third reference point on the pre-selected path, the second reference point equidistant from the first reference point and the third reference point;
moving the first reference point by a first incremental distance from the current location in a direction of travel on the pre-selected path, the second reference point maintaining equidistance from the first reference point and the third reference point and the second reference point and the third reference point moving in the direction of travel on the pre-selected path;
identifying a first angle formed by connecting the first reference point to the third reference point through the second reference point, the second reference point being the vertex of the first angle;
moving the first reference point by a second incremental distance from the current location in a direction of travel on the pre-selected path, the second reference point maintaining equidistance from the first reference point and the third reference point and the second reference point and the third reference point moving in the direction of travel on the pre-selected path;
identifying a second angle formed by connecting the first reference point to the third reference point through the second reference point, the second reference point being the vertex of the second angle;
identifying a most acute angle from the first angle and the second angle; and
determining a direction based on the most acute angle.

24. A system for determining a direction comprising:
a location unit for receiving a current location; and
a location tracking engine coupled to the location unit, the location tracking engine for receiving the current location from the location unit and determining that the current location is near a pre-selected path, identifying a first reference point, a second reference point and a third reference point on the pre-selected path, the second reference point equidistant from the first reference point and the third reference point, moving the first reference point by a first incremental distance from the current location in a direction of travel on the pre-selected path, the second reference point maintaining equidistance from the first reference point and the third reference point and the second reference point and the third reference point moving in the direction of travel on the pre-selected path, identifying a first angle formed by connecting the first reference point to the third reference point through the second reference point, the second reference point being the vertex of the first angle, moving the first reference point by a second incremental distance from the current location in a direction of travel on the pre-selected path, the second reference point maintaining equidistance from the first reference point and the third reference point and the second reference point and the third reference point moving in the direction of travel on the pre-selected path, identifying a second angle formed by connecting the first reference point to the third reference point through the second reference point, the second reference point being the vertex of the second angle, identifying a most acute angle from the first angle and the second angle and determining a direction based on the most acute angle.

* * * * *